United States Patent [19]
Huh

[11] Patent Number: 5,856,852
[45] Date of Patent: Jan. 5, 1999

[54] METHOD FOR PROVIDING RECORDING-RESERVATION DATA TO A VCR USING A TV AND A VCR ADAPTED THERETO

[75] Inventor: Chung Hyoea Huh, Suwon-si, Rep. of Korea

[73] Assignee: LG Electronics Inc., Seoul, Rep. of Korea

[21] Appl. No.: 612,460

[22] Filed: Mar. 7, 1996

[30]     Foreign Application Priority Data

Feb. 27, 1996 [KR]  Rep. of Korea ................. 1996/4837

[51] Int. Cl.⁶ .............................. H04N 7/00; H04N 11/00
[52] U.S. Cl. .......................... 348/460; 348/468; 386/83
[58] Field of Search .................................. 348/460, 461, 348/468, 473, 474, 563, 564, 565, 83; 386/83

[56]      References Cited

U.S. PATENT DOCUMENTS

| | | | |
|---|---|---|---|
| 4,977,455 | 12/1990 | Young | 348/468 |
| 4,991,017 | 2/1991 | Raaijmakers | 348/468 |
| 5,046,167 | 9/1991 | Nakano et al. | 358/335 |
| 5,253,066 | 10/1993 | Vogel | 348/734 |
| 5,486,865 | 1/1996 | James | 348/468 |
| 5,552,833 | 9/1996 | Henmi et al. | 348/460 |
| 5,625,422 | 4/1997 | Kim | 348/731 |

*Primary Examiner*—Mark R. Powell
*Assistant Examiner*—Vivek Srivastavia

[57]          ABSTRACT

A method for providing recording-reservation data to a VCR using a TV, and the TV and VCR adapted to the method are proposed, in which broadcasting signals are received via a receiving section of the TV, and teletext data consisting of plural informations is detected from the received broadcasting signal via a detecting section of the TV. The detected teletext data is stored in a memory of the TV by a controlling section of the TV, and at least one information required for recording reservation of the VCR in the stored teletext data is transmitted to the VCR. A controlling section of the VCR stores transmitted at least one information in a memory of the VCR as the recording reservation information.

39 Claims, 19 Drawing Sheets

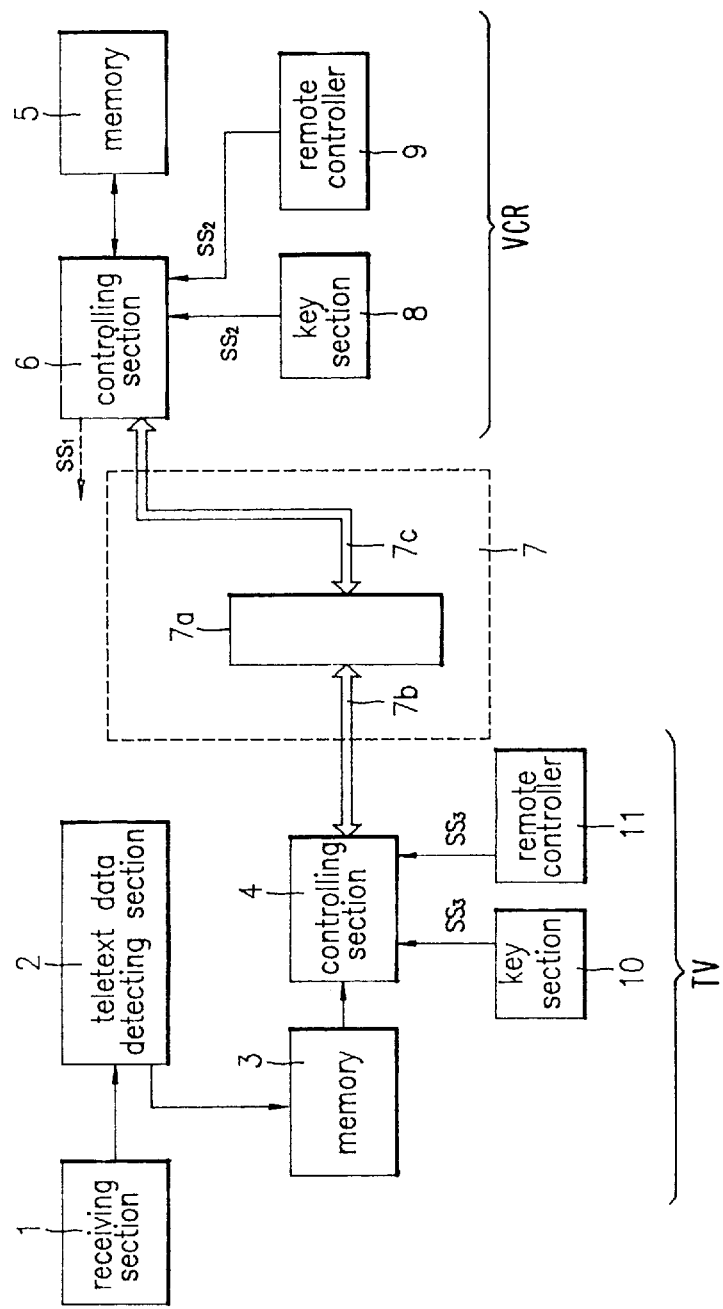

FIG. 7

```
P303      303    ARD/ZDF   Mo 24.05.93    Mo 24.05.93
                                             montag
                                          24.Mai.1993

ARD ─────────────────────────────────────────────

✻ = VT-Untertitel......150

19.58 ▬        Houte abend im Erstem
20.00          Tagesschau✻    · · · · · · · · · · · 310

20.15  20.14   elisabeeh die letzte?
               berich uber die
               Zukunft des
               Hauses Windsor  · · · · · · · · · · · 309
```

```
PR     DATE   START    -    STOP    VPS
ARD    24.05  19.58    -    20.00   ON
```

METHOD FOR PROVIDING RECORDING-RESERVATION DATA TO A VCR USING A TV AND A VCR ADAPTED THERETO

BACKGROUND OF THE INVENTION

1. Field of the Invention

The present invention relates to a method for providing recording-reservation data to a VCR (Video Cassette Recorder) using a TV (television), and the TV and VCR adapted thereto.

2. Description of the Background Art

In accordance with the conventional art, a user provides all recording-reservation data to a VCR by manipulating the VCR. That is, the VCR has been the main subject when carrying out a recording reservation mode. In the conventional methods, the recording reservation mode is carried out by using information separately loaded on partial lines of broadcasting signals.

The separate informations are supplied from the broadcasting stations, and are separately loaded on the partial lines of the broadcasting signals apart from video signals.

For example, individual information loaded on the broadcasting signals by the broadcasting stations of Europe will be briefly described below.

First, a teletext signal is loaded on the partial lines of broadcasting signals, and consists of digital data corresponding to characters or graphics. The teletext signal includes news information, stock information, entertainment information, leisure information, sports information, TV guide information, and the like.

The broadcasting stations of Europe currently provide information corresponding to 100–999 pages using the teletext signal, and each page is comprised of a sub-page and a multipage to additionally afford detailed information.

A video programmable teletext (hereinafter "VPT") information is also included in the teletext signal. The VPT which denotes TV program guide information supplies detailed information about broadcasting programs.

Accordingly, the recording reservation mode in the VCR can be performed more easily by means of the VPT information.

Second, a video program service (hereinafter "VPS") signal will now be mentioned. The VPS signal is generally loaded on the 16th line of the broadcasting signal in the form of a digital signal, which provides the video program information of respective broadcasting signals. The VPS signal assists the VCR to execute the preprogrammed recording of a desired program more accurately. The VPS signal is formed with codes of various kinds. The codes include a general code, an interrupt code, a dummy code, a system code, etc.

The general code is related to a preprogrammed-recording start time of a desired broadcasting program, and the interrupt code is related to notifying a section of a broadcasting signal, such as advertisements, unrelated to an actual broadcasting program. The dummy code related to an ending time of the desired broadcasting program, and the system code is a kind of an instruction code for performing the preprogrammed-recording of the desired program by using the time preset in the VCR.

As stated above, the VPS signal supplies the starting time information and ending time information of the broadcasting program for executing the preprogrammed recording to the VCR.

Third, a program delivery control (hereinafter "PDC") signal will be described. The PDC signal is almost similar to the VPS signal. But the PDC signal further includes a continuous code in addition to the codes of the VPS signal. The continuous code is for notifying the continuation of the desired broadcasting program.

In more detail, when a sport game is subjected to a relay broadcast, it may be continued over a regular relay broadcasting time. Then, the play exceeding the regular relay broadcasting time may be broadcasted via another broadcasting station. The continuous code is for announcing such information.

Therefore, the PDC signal is utilized to enable the VCR to thoroughly carry out the preprogrammed reservation of the desired sport game.

According to the conventional methods, the VCR must be equipped with a decoder for detecting individual information from a broadcasting signal so as to use the individual information provided from the broadcasting stations in the preprogrammed recording mode or recording reservation mode.

Consequently, since a decoder is an expensive equipment, the burdensome manufacturing cost of the VCR is increased due to incorporation of decoders for detecting individual informations provided from the broadcasting stations.

Conventional VCRs can be classified into diverse types: e.g., VCRs having a simple function without involving any decoders, VCRs having a VPS decoder, VCRs having an auto channel mapping system (hereinafter "ACMS") and VCRs having both VPS decoder and ACMS.

Here, the ACMS is employed for adjusting respective broadcasting channel numbers to be suitable for the corresponding area where the VCR is placed, and for mapping the original channel number to the adjusted channel number to provide the mapped channel tuning data.

For example, the broadcasting signal of a certain broadcasting station is received in the channel number of "10" which may be "11" in another area besides the broadcasting center.

In this case, the ACMS searches out the adjustment number of "11" and supplies the channel tuning data having "10" and "11."

When the recording reservation mode is performed by means of the above-described conventional VCRs, the following problems occur.

First, in order to carry out the recording reservation mode or preprogrammed-recording mode by using all individual information supplied from the broadcasting stations, the decoder or other elements for detecting the information should be furnished to heighten the manufacturing cost of the VCR, considerably.

Second, in a case where the teletext signal is included in the construction of the VCR, the teletext decoder is repeatedly adopted for executing the recording reservation mode since almost all TV receivers are already equipped with the teletext decoder capable of detecting the teletext signal.

Third, in association with the VCRs having partial decoders for detecting individual information, the user is inconvenienced by having to manually provide the recording-reservation data which is not supplied by the partial decoders to the VCR one by one.

Fourth, since the main subject of performing the recording reservation mode has been the VCR in accordance with the conventional methods, the user must manipulate the TV as well as the VCR in order to consult the TV guide information in the teletext signal when performing the recording reservation mode.

Consequently, there has been the inconvenience of manipulating the TV as well as the VCR for executing the Recording reservation mode.

SUMMARY OF THE INVENTION

It is an object of the present invention to provide a method for providing recording-reservation data to a VCR using a TV capable of conveniently performing a reservation mode.

It is another object of the present invention to provide a TV adapted to the above method.

It is still another object of the present invention to provide a VCR adapted to the above method capable of significantly lowering manufacturing cost.

To achieve the above and other objects of the present invention, there is provided a method for providing recording-reservation data to a VCR using a TV. The method includes receiving broadcasting signals via the TV, detecting teletext data having a plurality of informations from the received broadcasting signals, and storing the detected teletext data in a memory of the TV. In the method, at least one information required for recording reservation of the VCR in the stored teletext data is transmitted to the VCR in accordance with a selection signal supplied to the TV, and the transmitted, at least one information is stored in a memory of the VCR as the recording reservation information.

A television according to the present invention includes a receiving section for receiving broadcasting signals, a detecting section for detecting teletext data having plural kinds of information from the received broadcasting signals, and a memory for storing the detected teletext data. In addition, a controlling section provides at least one information in the stored teletext data to the memory as the recording-reservation data of a VCR in accordance with a supplied selection signal, and an interface section capable of performing bilateral communication connects the VCR and the controlling section to transmit at least one information supplied from the memory to the VCR.

A VCR according to the present invention has a bilaterally communicating interface section for transmitting a selection signal to a TV, and receiving at least one recording-reservation information transmitted from the TV in accordance with the selection signal. Also, a memory stores at least one recording-reservation information supplied from the TV in accordance with a memory control signal, and a controlling section supplies the selection signal to the TV via the bilaterally communicating interface section, and supplies the memory control signal to the memory.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed descriptions.

BRIEF DESCRIPTION OF THE DRAWINGS

The above objects and other advantages of the present invention will become more apparent by describing in detail preferred embodiments thereof with reference to the attached drawings in which:

FIG. 2A is a block diagram showing a construction of the TV, VCR and a bilateral communicating interface section for connecting these devices adapted to the method of FIG. 1;

FIG. 7 is a diagram showing one example of the TV screen displayed with the TV guide information according to the embodiments of the present invention;

DETAILED DESCRIPTION OF THE PREFERRED EMBODIMENTS

Hereinbelow, a method for providing recording-reservation data to a VCR using a TV, and constructions of the TV and VCR adapted to the method according to the present invention will be described in detail with reference to accompanying drawings.

Figure 1:
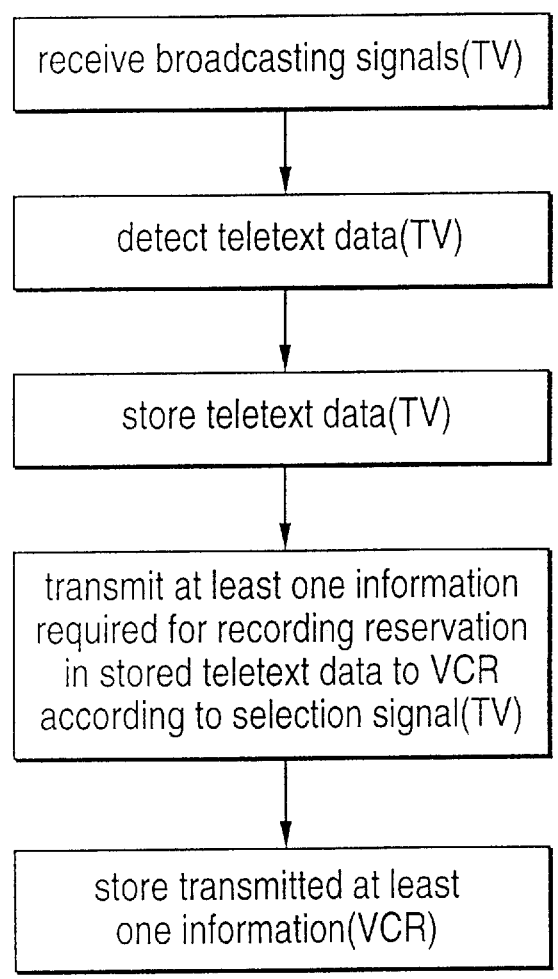
FIG. 1 is a flow chart showing a method for providing recording-reservation data to a VCR using a TV according to the embodiments of the present invention.

FIG. 1 is a schematic flow chart showing the method for providing the recording-reservation data to the VCR using the TV according to the embodiments of the present invention.

Referring to FIG. 1, broadcasting signals are first received via a TV (television).

Successively, teletext data carrying information is detected from the received broadcasting signals, and the detected teletext data is stored in a memory of the TV.

In the teletext data stored in accordance with a selection signal supplied to the TV, at least one information required for recording reservation is transmitted to the VCR.

The transmitted at least one information is stored in a memory of the VCR as the recording-reservation data.

FIG. 2A is a block diagram showing the main construction of the TV, the VCR and an interface section which interfaces the TV and VCR to enable bilateral communication according to the present invention.

Figure 2B:
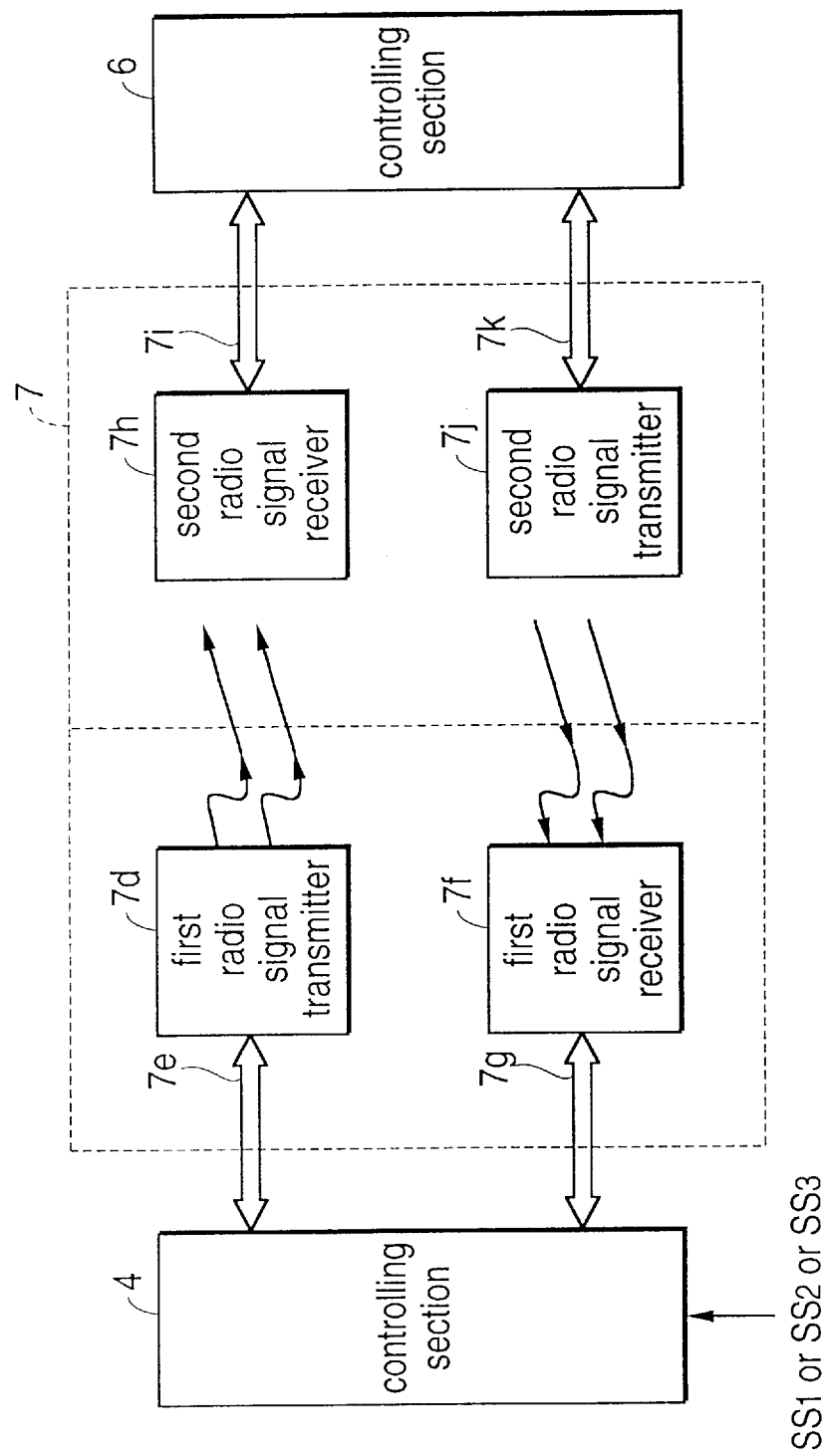
FIG. 2B is a block diagram showing another embodiment of the bilateral communicating interface section of FIG. 2A.

FIG. 2B is a block diagram showing another embodiment of the interface section of FIG. 2A.

Referring to FIG. 2A, the TV includes a receiving section 1 for receiving the broadcasting signals via an antenna, a teletext data detecting section 2 for detecting the teletext data carrying plural kinds of information from the received broadcasting signals, and a memory 3 for storing the detected teletext data. In addition to these elements, the TV includes a controlling section 4 which transforms at least one information in the teletext data stored in the memory 3 as the recording-reservation data in response to one selection signal supplied thereto.

Meanwhile, the VCR has a memory 5 and a controlling section 6 for receiving the recording-reservation data transmitted from the TV to store the received data in memory 5.

In FIG. 2A, an interface section 7 includes a bilateral communicating jack 7a, a first bilateral communicating bus 7b for connecting the controlling section 4 of the TV and the bilateral communicating jack 7a, and a second bilateral communicating bus 7c for connecting the controlling section 6 of the VCR and the bilateral communicating jack 7a.

Here, a scart jack may be applied as the bilateral communicating jack 7a, and inter IC ($I^2C$) bus may be applied as the first and second buses 7b and 7c. The interface section can belong to either the TV or the VCR.

In FIG. 2A, a reference numeral $SS_1$ denotes any one selection signal among three kinds of selection signals supplied to the controlling section 4 of the TV, which is intrinsically provided from the controlling section 6 of the VCR.

A reference numeral $SS_2$ is another selection signal of the three kinds of selection signals, which is supplied to the controlling section 4 of the TV via the VCR in conformity with a user's selection.

That is, the user provides the selection signal $SS_2$ via a key section 8 equipped on a panel (not shown) of the VCR or a key section (not shown) provided on a remote controller 9.

A reference numeral $SS_3$ is the third selection signal of the three kinds, which is directly supplied to the controlling section 4 of the TV by the user's selection without passing through the VCR.

In other words, the user supplies the selection signal $SS_3$ via the key section 10 furnished on the panel of the TV or that of the remote controller 11.

The above-stated selection signals $SS_1 \sim SS_3$ are signals for selecting at least one information required for preprogramming the recording reservation of the VCR from the detected teletext data. Here, only one selection signal among the three is supplied to the controlling section 4 of the TV by the selection within the VCR or the user.

It should be noted that the selection signal $SS_1$ is previously stored in the controlling section 6 of the VCR in accordance with the characteristic of the VCR to be automatically supplied to the controlling section 4 of the TV without the user's selection. Also, the selection signals $SS_2$ and $SS_3$ are produced by a key signal which is manually supplied by the user to the controlling section 4 of the TV by means of the key section or remote controller of the TV and VCR in view of the teletext displayed on the TV screen.

A further description with respect to the signals $SS_1$–$SS_3$ will be given later in relation to the operation description according to the present invention.

In FIG. 2A, reference numerals 8 and 9 denote a key section provided on the panel of the VCR and a remote controller, respectively. Reference numerals 10 and 11 denote the key section and the remote controller of the TV, respectively.

FIG. 2B is a block diagram showing another embodiment of the interface section 7 according to the present invention.

While the interface section 7 shown in FIG. 2A is in the form of a wired connection, that shown in FIG. 2B has a radio communication pattern.

In FIG. 2B, the interface section 7 includes a first radio signal transmitter 7d for converting at least one information from the controlling section 4 of the TV into the form of a radio signal to transmit the result to the VCR side, a third bus 7e for connecting the controlling section 4 of the TV to the first signal transmitter 7d, and a first radio signal receiver 7f for receiving the radio signal from the VCR to transmit the result to the controlling section 4.

Also, a fourth bus 7g connects the first radio signal receiver 7f and controlling section 4, a second radio signal receiver 7h transfers the radio signal from the first radio signal transmitter 7d to the controlling section 6 of the VCR, and a fifth bus 7i connects the second radio signal receiver 7h and the controlling section 6 of the VCR. In addition, the interface section 7 has a second radio signal transmitter 7j for converting the signal from the controlling section 6 into a form of a radio signal to transmit the result to the TV, and a sixth bus 7k for connecting the second radio signal transmitter 7j and the controlling section 6 of the VCR. The third to sixth buses 7e, 7g, 7i and 7k employ a unilaterally communicating bus rather than a bilaterally communicating bus.

Here, the signal from the controlling section 6 of the VCR to second radio signal transmitter 7j is one of the selection Signals $SS_1$ and $SS_2$.

Now, the embodiments of the present invention will be described in detail.

First Embodiment

The first embodiment of the present invention shows a case where the method according to the present invention is adapted to the VCR having a simple function.

The VCR having the simple function denotes the VCR having the basic functions of a VCR, i.e., a recording function and a play function.

Figure 3:
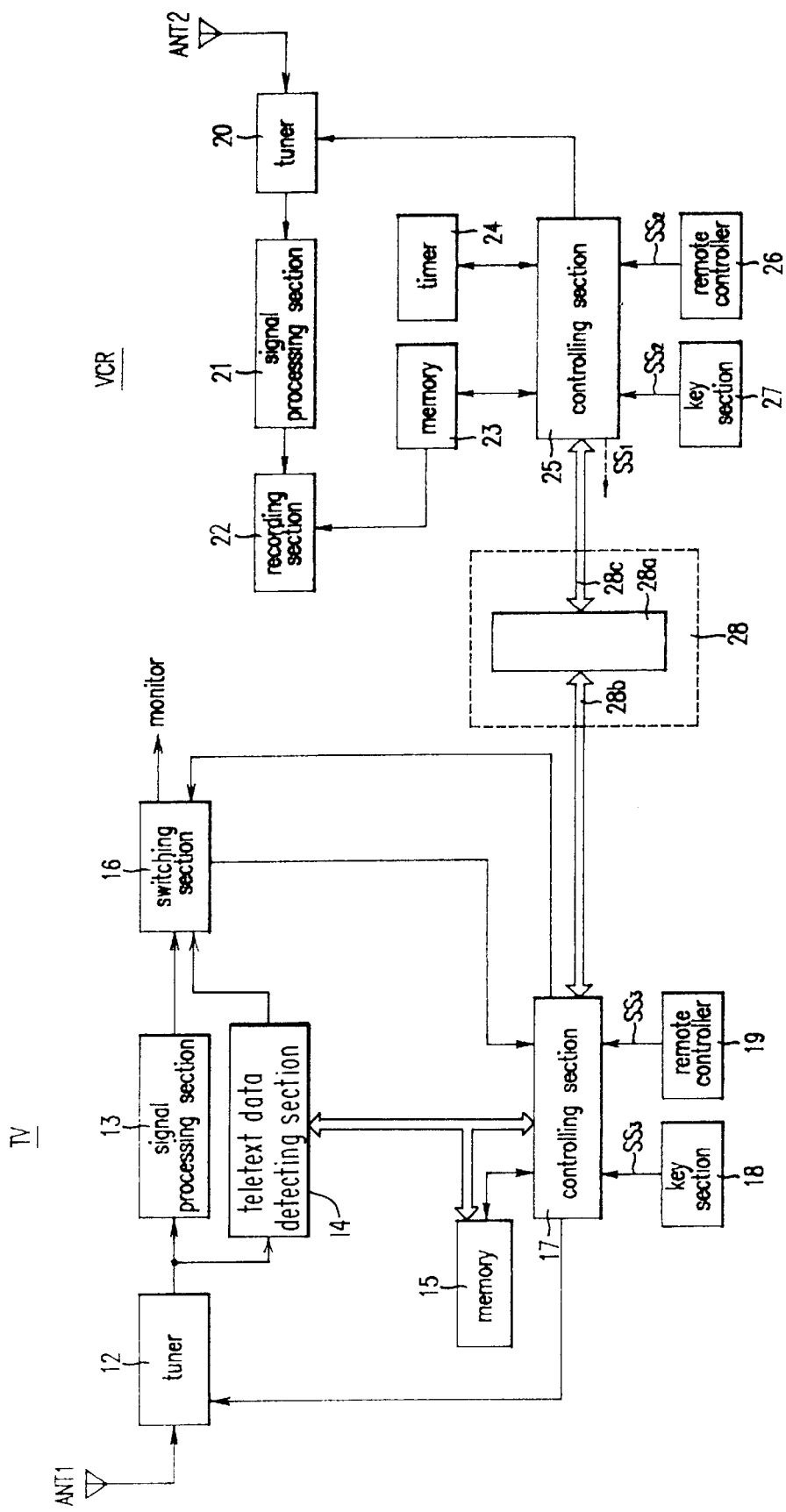
FIG. 3 is a block diagram showing the construction of a TV, a VCR and a bilateral communicating interface section for connecting these devices according to a first embodiment of the present invention.

FIG. 3 is a block diagram showing the construction of a TV, a VCR and an interface section for connecting these elements according to the first embodiment of the present invention.

In FIG. 3, the TV has an antenna ANTI, and a tuner 12 for tuning a single broadcasting signal among the broadcasting signals received via the antenna ANTI in accordance with a tuning signal. A signal processing section 13 processes the tuned broadcasting to be displayed, and a teletext data detecting section 14 detects teletext data from the tuned broadcasting signal. A memory 15 stores the teletext data in accordance with a memory control signal, and a switching section 16 provides either one of the broadcasting signal from the signal processing section 13 and the teletext data from the teletext detecting section 14 to a monitor in accordance with a switching control signal. The tuning signal, memory control signal and switching control signal are supplied by a controlling section 17 which also produces at least one information required for recording reservation of the VCR in the teletext data stored in the memory 15 in accordance with the supplied selection signal (any one among $SS_1$, $SS_2$ and $SS_3$). A key section 18 placed on a panel of the TV provides a key signal for generating the selection signal $SS_3$ to the controlling section 17 by a user through a wired connection, and a remote controller 19 supplies the key signal for generating the selection signal $SS_3$ to the controlling section 17 in radio transmission pattern by the user.

Referring to FIG. 3, the VCR adapted to the method according to the present invention is comprised of an antenna ANT2, and a tuner 20 for tuning only one broadcasting signal among broadcasting signals received via the antenna ANT2 in accordance with a tuning control signal. In addition, a signal processing section 21 processes the tuned broadcasting signal to be recorded, and a recording section 22 records the recordably-processed broadcasting signal in accordance with a record control signal onto one recording medium. Also, a memory 23 stores at least one recording-reservation information transmitted from the TV in accordance with a memory control signal, a timer 24 supplies time information, and a controlling section 25 provides the memory control signal, tuning control signal and record control signal, and supplies the selection signal $SS_1$ previously stored therein to the TV. A key section 27 supplies the key signal for generating selection signal $SS_2$ to the controlling section 25 of the VCR through the wired connection in accordance with the user's selection, and a remote controller 26 provides the key signal for generating the selection signal $SS_2$ to the controlling section 25 of the VCR in a radio transmission pattern by the user's selection.

In FIG. 3, the interface section 28 is formed of a bilateral communicating scart jack 28a, a first $I^2C$ bus 28b as the bilateral communicating bus for connecting the controlling section 17 of the TV and the scart jack 28a, and a second $I^2C$ bus 28c for connecting the controlling section 25 of the VCR and the scart jack 28a. Here, the interface section 28 may belong to the TV or the VCR.

As illustrated in FIG. 2B, the interface section 28 may be constructed with two radio signal transmitters and two radio signal receivers. Here, one radio signal transmitter and one radio signal receiver substantially belong to the TV, and the other radio signal transmitter and radio signal receiver belong to the VCR. Here, the radio signal is an infrared ray signal.

In the construction of the TV shown in FIG. 3, the controlling section 17 supplies date information, broadcasting program start information, broadcasting program ending information and channel tuning information of the teletext data stored in the memory IS to the VCR, via the scart jack 28a, as the recording-reservation data of the VCR.

At this time, the controlling section 17 confirms that the VCR interfaced with the selection signal (any one among $SS_1$, $SS_2$ and $SS_3$) has the simple function by the selection signal, and provides the recording-reservation data suitable for the VCR having the simple function to the VCR.

Among the selection signals $SS_1$~$SS_3$, the selection signal $SS_1$ previously stored within the controlling section 25 of the VCR is automatically supplied to the controlling section 17 of the TV, whereas the selection signals $SS_2$ and $SS_3$ are supplied to the controlling section 17 of the TV by the selection of the user as stated above.

Therefore, it is necessary to display the teletext data stored in the memory 15 of the TV on a TV screen (i.e., on a monitor) so as to supply the selection signals $SS_2$ and $SS_3$ desired by the user.

First of all, a case of supplying the selection signal $SS_1$ previously stored within the VCR to the TV will be described with reference to FIGS. 3, 4A and 4B.

Figure 4A:
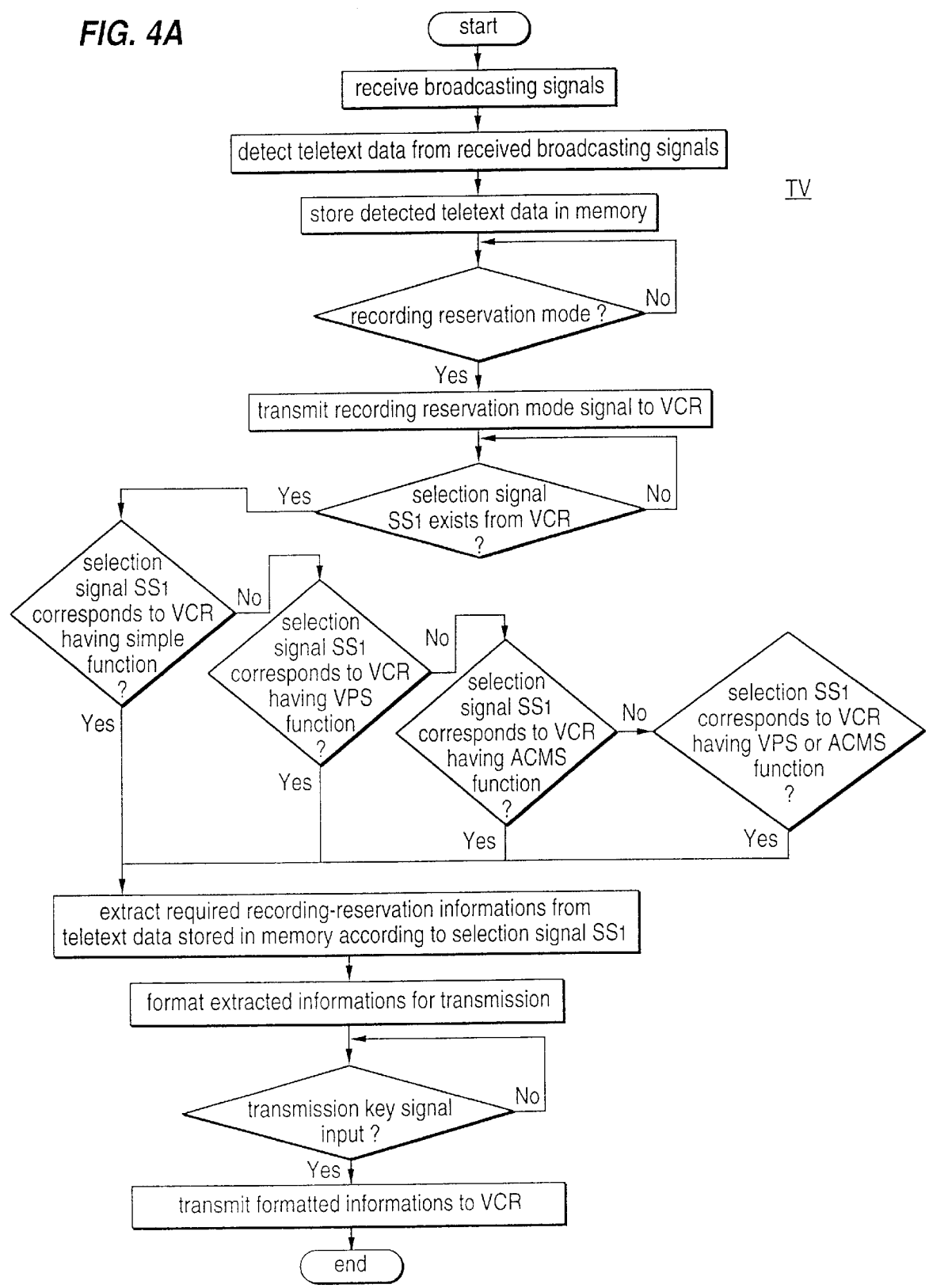
FIG. 4A is a flow chart showing one system program of the TV according to the first embodiment of the present invention.

Referring to FIG. 4A, the TV receives the broadcasting signals in order via the antenna ANTI and detects the teletext data from them to store the result in the memory 15.

Successively, it is checked whether or not the signal of recording reservation mode is provided by the user.

Upon the supply of the signal of recording reservation mode by the user, the controlling section 17 of the TV provides the signal of record reservation mode to the VCR side.

Figure 4B:
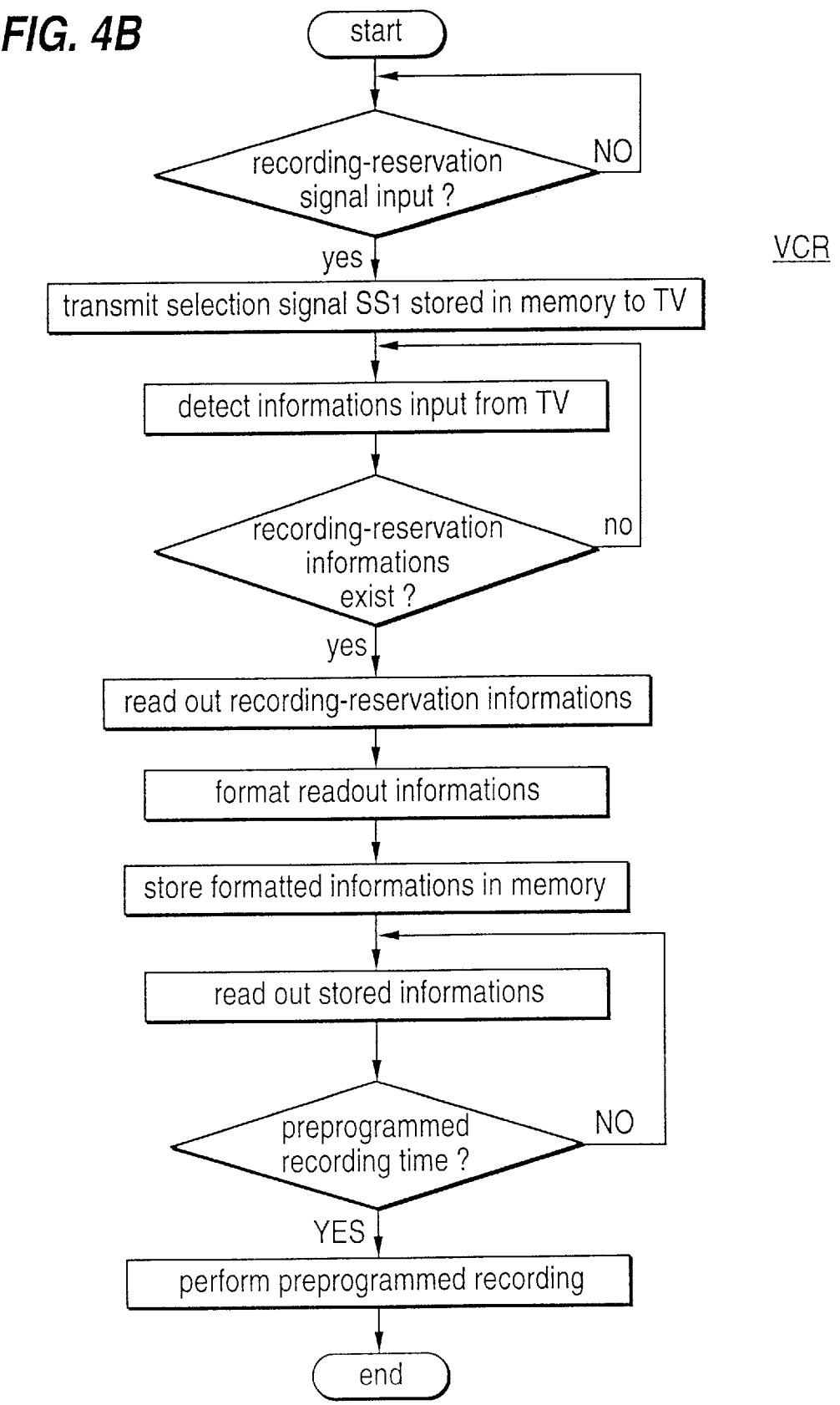
FIG. 4B is a flow chart showing one system program of the VCR according to the first embodiment of the present invention.

In the VCR side as shown in FIG. 4B, once the signal of recording reservation mode is received from the TV, the VCR transmits the selection signal $SS_1$ stored in the memory 23 to the TV side, via the scart jack 28a of the interface section 28.

At this time, the selection signal $SS_1$ is the signal which indicates to the TV that the present VCR is the VCR having the simple function.

Successively, as illustrated in FIG. 4A, when the selection signal $SS_1$ is received from the VCR by the controlling section 17 of the TV via the scart jack 28a, the TV checks to determine which kind of VCR the selection signal $SS_1$ corresponds to.

That is to say, the controlling section 17 of the TV checks whether the selection signal $SS_1$ corresponds to the VCR having the simple function, VCR having the VPS function, VCR having the ACMS function, and VCR having both VPS function and ACMS function.

In this embodiment, the TV recognizes that the selection signal $SS_1$ corresponds to the VCR having the simple function.

Accordingly, the controlling section 17 of the TV extracts at least one information, i.e., at least one of the date information, broadcasting program starting time information, broadcasting program ending time information, and channel tuning information required for the recording reservation of the VCR having the simple function, from the teletext data stored in the memory 15.

Then, the extracted information is formatted in a prearranged pattern for the transmission.

The information formatted as above sequentially passes through the first $I^2C$ bus 28b, scart jack 28a and second $I^2C$ bus 28c to the VCR side when a transmission key signal is supplied by the user to the controlling section 17, via the key section 18 or remote controller 19. Of course, the formatted information may be transmitted to the VCR side in a radio transmission pattern as shown in FIG. 2B.

Thereafter, as shown in FIG. 4B, the controlling section 25 of the VCR receives information from the TV, via the scart jack 28a shown in FIG. 3 or the second radio signal receiver 7h shown in FIG. 2B, and checks whether or not recording-reservation information exists in the received information.

If the recording-reservation information exists, the information is read out to be formatted in the pattern for recording reservation and then stored in the memory 23.

Thereafter, the stored recording-reservation information is read out by the controlling section 25 to perform a recording operation, and the controlling section 25 checks whether or not the current time matches the preprogrammed recording time by using this information.

Then, the recording operation is executed upon reaching the preprogrammed recording time, and the system program is finished.

Figure 5:
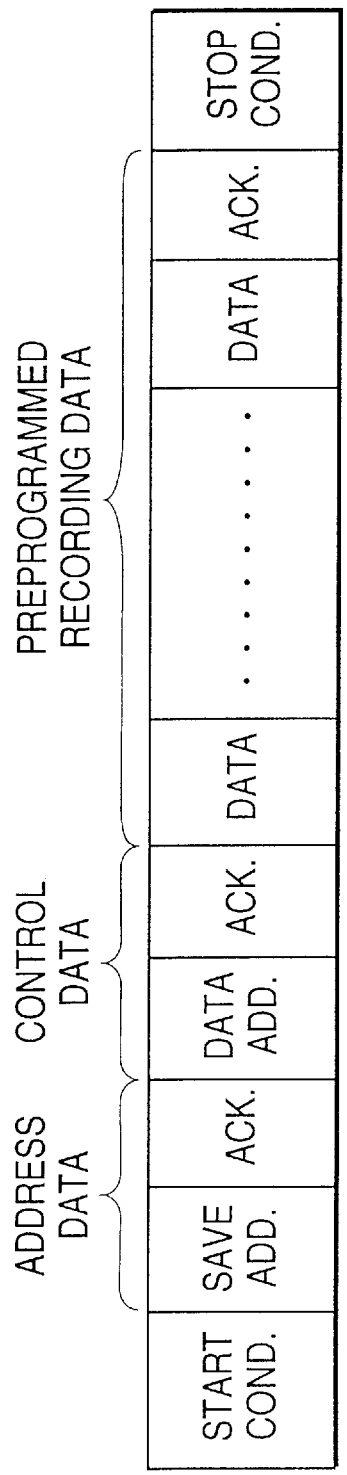
FIG. 5 is a diagram showing a formatted construction of recording-reservation information transmitted from the TV to VCR according to the present invention.

FIG. 5 is a diagram showing the formatted construction of the recording-reservation information transmitted from the TV to the VCR.

As shown in FIG. 5, the formatted construction includes Start Cond., address data, control data, recording-reservation data, and Stop Cond. Here, "Start Cond." refers to protocol data which notifies the start of information transmission via the I²C bus. "Slave add" denotes data designating the corresponding apparatus, which sets the VCR address herein. "Data Add" of the control data is data for controlling the corresponding apparatus. "Recording-reservation data" is at least one information in conformity with the selection signals $SS_1 \sim SS_3$.

As mentioned above, the recording-reservation information in the first embodiment includes date information, desired broadcasting program starting time information, desired broadcasting program ending time information, and channel tuning information.

In FIG. 5, "Stop Cond." is the protocol data which communicates the completion of the information transmission via the I²C bus. "ACK" inserted to respective ending portions of the address data, control data and recording-reservation data is supplied from the VCR side to the TV side, and is a signal for acknowledging the safe reception of the transmitted information.

The bilateral communicating scart jack 28a shown in FIG. 3 typically has 21 pins among which 8th and 12th pins are employed in the embodiments of the present invention.

One of the two pins ($8^{th}$ and $12^{th}$) is utilized for transmitting the recording-reservation data via the bilateral communicating I²C bus, and the other pin is for transmitting the control data via the I²C bus.

Figure 6A:
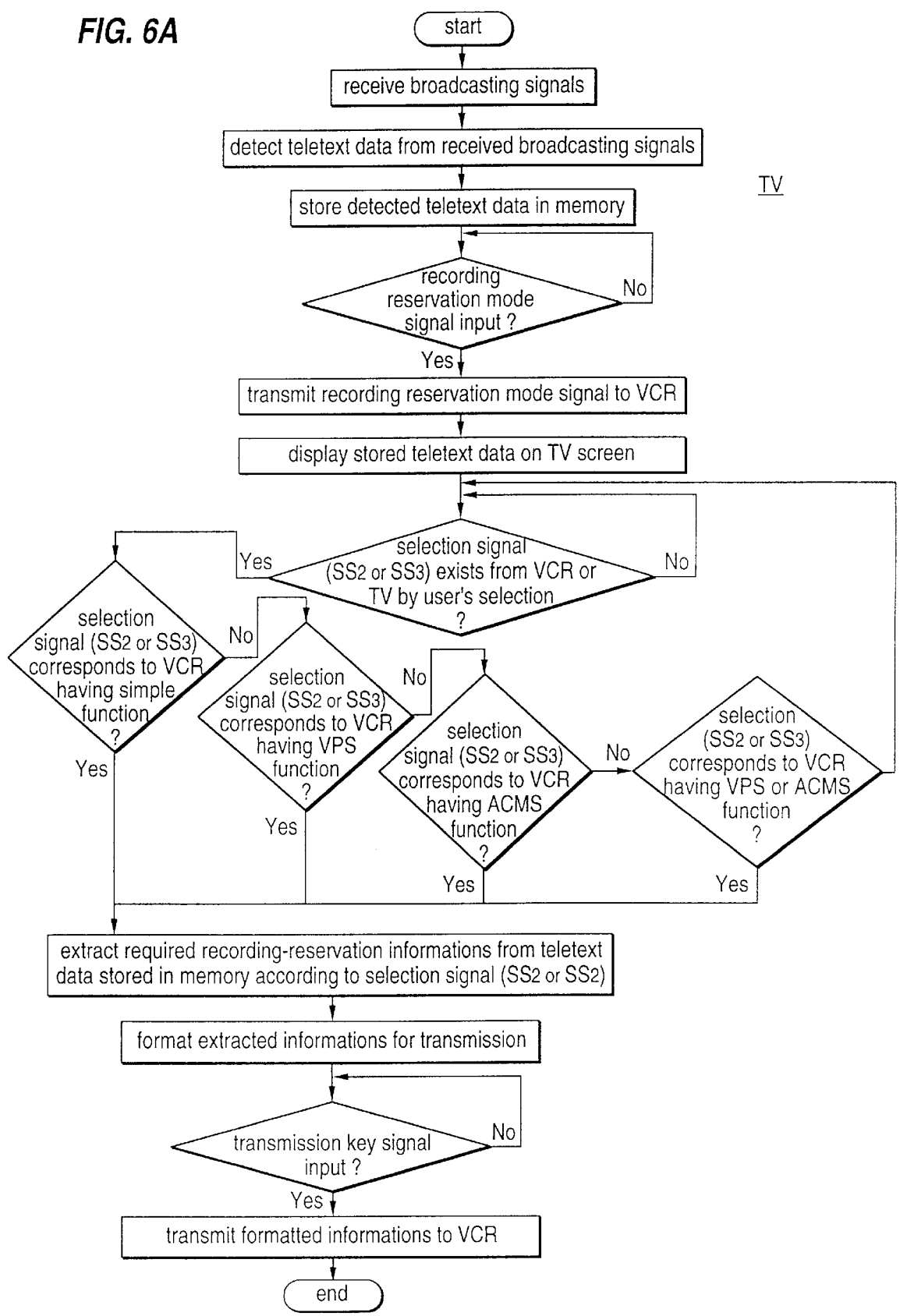
FIG. 6A is a flow chart showing another system program of the TV according to the first embodiment of the present invention.
Figure 6B:
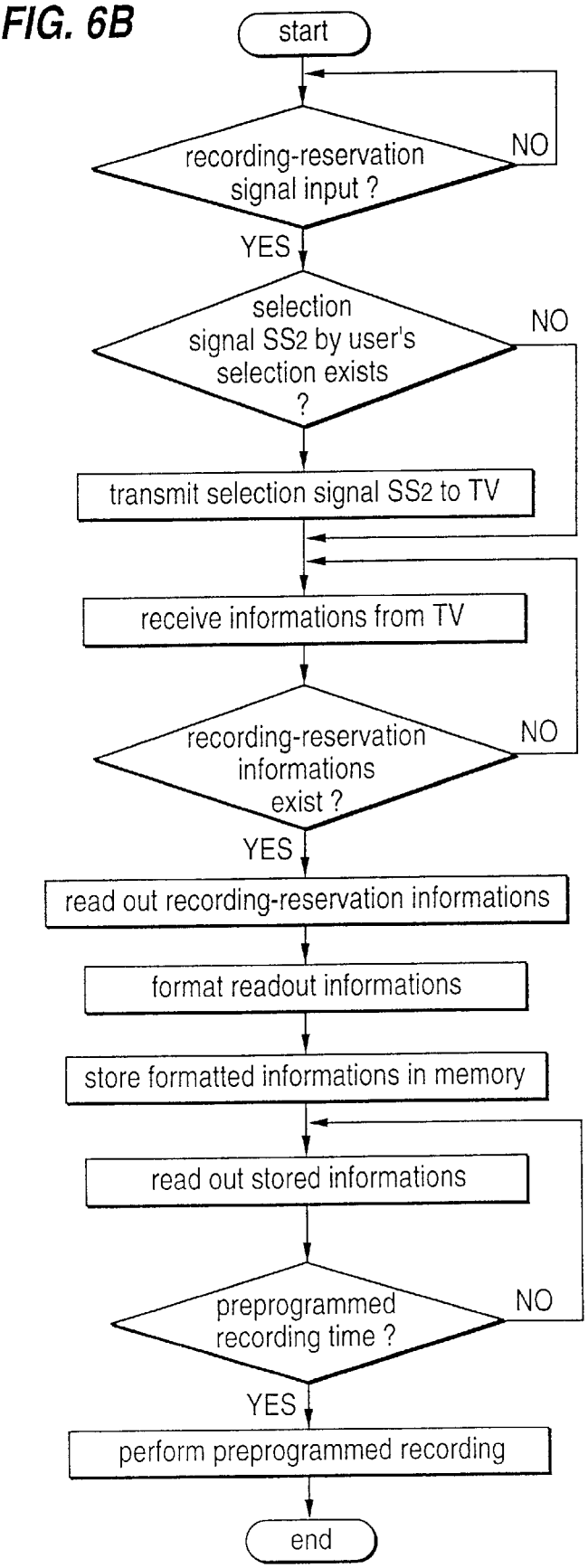
FIG. 6B is a flow chart showing another system program of the VCR according to the first embodiment of the present invention.

FIGS. 6A and 6B are flow charts for showing a case where the selection signals $SS_2$ and $SS_3$ previously not stored within the VCR but supplied by the user, are provided to the TV.

As shown in FIG. 6A, the TV first receives the broadcasting signals, and detects the teletext data from the received broadcasting signals.

Thereafter, the detected teletext data is stored in the memory 15 of FIG. 3.

Successively, it is checked whether the signal of the recording reservation mode is produced by the user. If the signal of recording reservation mode is received, the identical signal of recording reservation mode is transmitted to the controlling section 25 of the VCR via the radio signal transmitter or scart jack 28a shown in FIG. 3.

Then, TV guide information required for recording reservation in the teletext data stored in the memory 15 of the TV is displayed on the TV screen (or monitor).

At this time, the user can provide the desired selection signal $SS_3$ to the controlling section 17 of the TV, via the key section 18 or remote controller 19 of the TV, in consideration of the TV guide information displayed on the TV screen.

Additionally, the user may provide the desired selection signal $SS_2$ to the controlling section 17 of the TV, via the key section 27 or remote controller 26 of the VCR.

FIG. 7 illustrates one example of the TV screen displayed with the TV guide information.

The TV screen illustrated in FIG. 7 is the TV guide information included in the teletext data supplied from the ARD broadcasting station, Germany.

In FIG. 7, "P303" and "303" on the left side of the screen designate the columns corresponding to the TV guide information, and "ARD/ZDF" is the name of the broadcasting station on the TV guide.

"MO 24.05.93" designates the present date, and "14:34:24" is the current time.

"Montag, 24, Mai, 1993" on the right side designates the calendar.

"ARD" disposed on the left side designates an actual name of the broadcasting station.

"*=VT-Untertitel . . . 150" denotes corresponding information of the teletext data, and "19.58", "20.00" and "20.15" designate starting times of the broadcasting programs.

"20.14" designates the initial recognition information of the broadcasting program, i.e., conceal information.

"Houte abend im Erstem" and the like placed on the right of the respective broadcasting starting times represent the names of the respective broadcasting programs corresponding to the respective broadcasting starting time.

"310" and "309" are numbers designating a page and the succeeding page corresponding to the respective broadcasting programs.

"PR", "Date Start", "Stop" and "VPS" placed on the bottom of the TV screen designate recording-reservation data selected by the user using a cursor on the TV screen. More specifically, "PR" denotes the name of the broadcasting station, "Date" indicates the recording-reservation date, "Start" indicates the starting time of the corresponding broadcasting program, "Stop" indicates the ending time of the corresponding broadcasting program and "VPS" indicates the on/off status of the recording reservation mode.

In view of the TV guide information displayed on the TV screen, the user can provide a selection signal $SS_2$ to the controlling section 17 of the TV via the VCR, or directly provide a selection signal $SS_3$ to the controlling section 17 of the TV.

In this embodiment, both selection signals $SS_2$ and $SS_3$ correspond to the VCR having the simple function.

Back to FIG. 6B, the VCR checks whether the selection signal $SS_2$ by the selection of the user exists when the signal of recording reservation mode is supplied from the TV side.

Absent the selection signal $SS_2$, it is regarded that the user will directly provide the selection signal $SS_3$ to the controlling section 17 of the TV.

Otherwise, if the selection signal $SS_2$ exists, the selection signal $SS_2$ is transmitted to the controlling section 17 of the TV via the scart jack 28a, or to the second radio signal transmitter 7j shown in FIG. 2B.

Successively, the controlling section 17 of the TV checks whether or not the selection signal $SS_2$ or $SS_3$ by the user's selection is supplied thereto as shown in FIG. 6A.

When the selection signal $SS_2$ or $SS_3$ is supplied, it is checked whether the selection signal corresponds to the VCR having the simple function, VCR having the VPS function, VCR having the ACMS function or VCR having both ACMS and VPS functions.

In accordance with the checked selection signal $SS_2$ or $SS_3$, at least one information required for recording reservation is extracted from the teletext data stored in the memory 15.

Since the method according to the present invention is adapted for use with the VCR having the simple function in the first embodiment, the extracted information in the first embodiment includes date information, broadcasting program starting time information, broadcasting program ending time information, and channel tuning information as described above. Thereafter, the extracted information is formatted in the pattern as shown in FIG. 5.

The controlling section 17 transmits the formatted information to the controlling section 25 of the VCR, via the scart jack 28a or first radio signal transmitter 7d of FIG. 2B, upon the reception of the transmission key signal by the user.

Again referring to FIG. 6B, the controlling section 25 of the VCR receives the information transmitted from the TV, via the scart jack 28a or second radio signal receiver after transmitting the selection signal $SS_2$ to the TV.

Then, the controlling section 25 checks whether the recording-reservation information exists in the received information. If the recording-reservation information exists, the information is read out to be formatted for performing a recording operation, and stored in the memory 23.

Thereafter, the controlling section 25 of the VCR reads out the recording-reservation information stored in the memory 23 to check whether or not the current time matched the preprogrammed recording time. When the current time reaches the preprogrammed recording time, the controlling section 25 of the VCR carries out the recording process of the reserved program.

Second Embodiment

The second embodiment of the present inventions is directed to a case where the method according to the present invention applies to the VCR having a VPS function.

Figure 8:
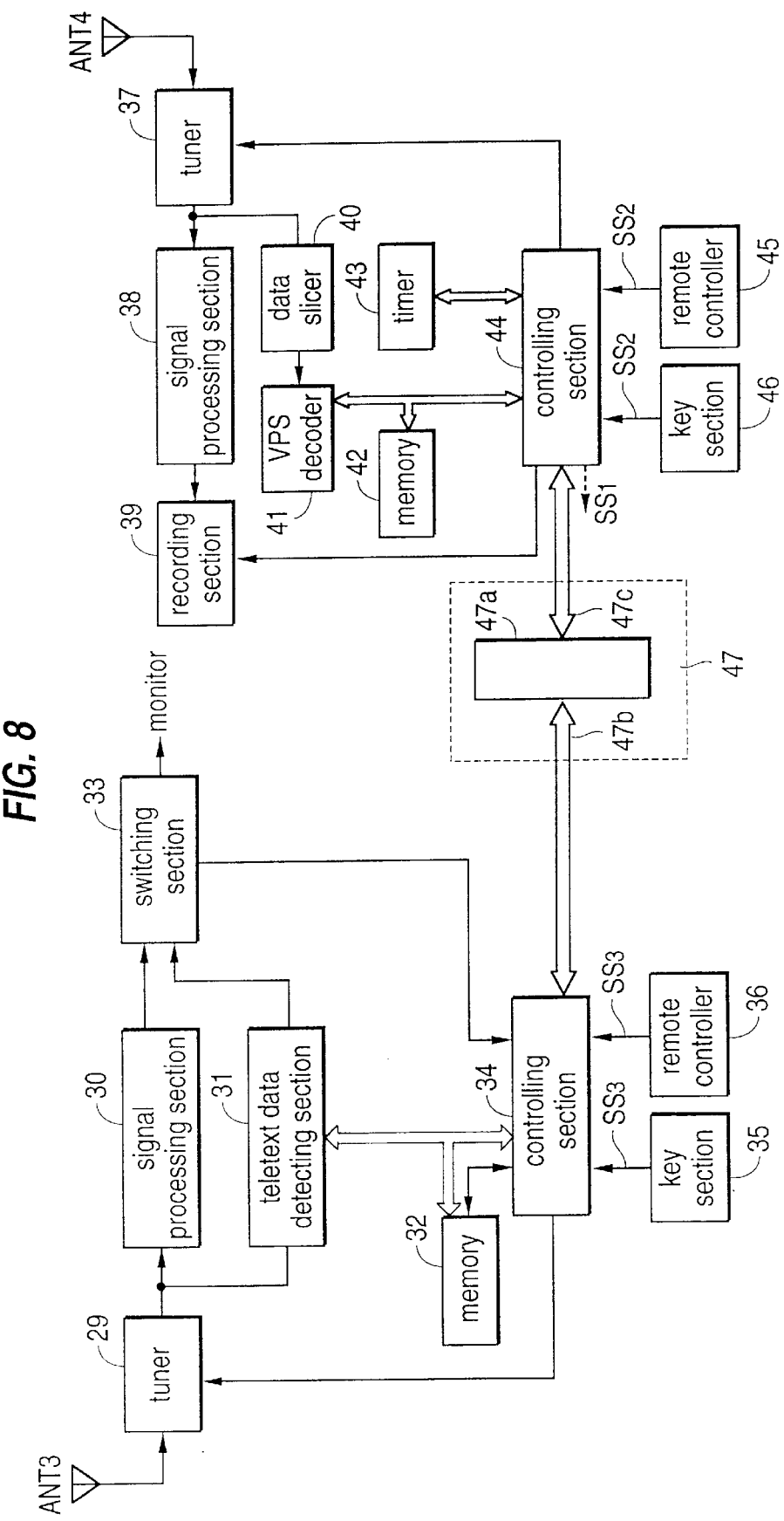
FIG. 8 is a block diagram showing a construction of a TV, a VCR and a bilateral communicating interface section according to a second embodiment of the present invention.

FIG. 8 is a block diagram showing a construction of a TV, a VCR and an interface section for connecting the TV and VCR according to the second embodiment of the present invention.

Referring to FIG. 8, the TV according to the second embodiment of the present invention includes an antenna ANT3, a tuner 29, a signal processor 30, a teletext data detecting section 31, a memory 32, a switching section 33, a controlling section 34, a key section 35 and a remote controller 36.

The construction of the TV shown in FIG. 8 is the same as that shown in FIG. 3. Therefore, the detailed description of the construction of the TV will be omitted.

In FIG. 8, the VCR according to the second embodiment of the present invention includes an antenna ANT4, and a tuner 37 for tuning a single broadcasting signal among the broadcasting signals received via the antenna ANT4 in accordance with a tuning control signal. A signal processing section 38 processes the tuned broadcasting to be recordable, and a recording section 39 records the broadcasting signal from the signal processing section 38 on a recording medium. A data slicer 40 slices the tuned broadcasting signal, and a VPS decoder 41 detects a VPS signal from the sliced broadcasting signal by using a decoding control signal. A memory 42 stores the VPS signal and recording-reservation information transmitted from the TV in accordance with a memory control signal, and a timer 43 provides time information to a controlling section 44 when the VPS signal is absent. The decoding control signal, memory control signal and previously-stored selection signal $SS_1$ are supplied by the controlling section 44. Additionally, the VCR includes a remote controller 45 for supplying a key signal for generating the selection signal $SS_2$ to the controlling section 44 by the user's selection in a radio transmission pattern and a key section 46 for providing the key signal for generating the selection signal $SS_2$ to the controlling section 44 through a wired connection according to the user's selection.

Identical to the first embodiment, an interface section 47 has a scart jack 47a, a first $I^2C$ bus 47b for connecting the controlling section 34 of the TV and the scart jack 47a, and a second $I^2C$ bus 47c for connecting the controlling section 44 of the VCR and the scart jack 47a. Further, the interface section 47 may belong to the TV side or the VCR side.

In FIG. 8, since the starting time and ending time information of the desired program is already included in the VPS signal detected in the VPS decoder 41, it is unnecessary to supply the same information from the TV side.

Figure 9A:
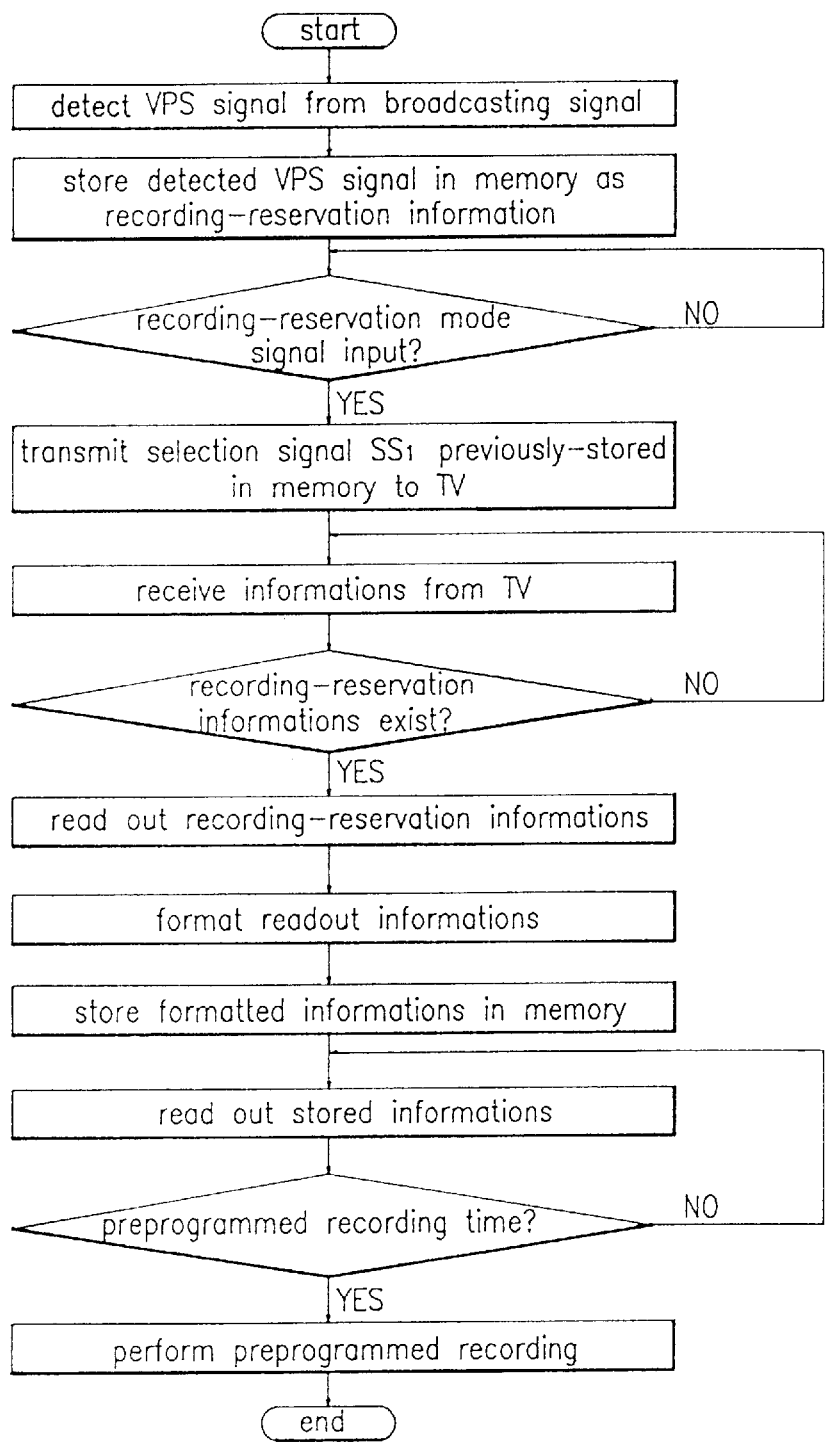
FIG. 9A is a flow chart showing one system program of the VCR according to the second embodiment of the present invention.

FIG. 9A is a flow chart relating to a case where the required recording-reservation information is supplied from the TV to VCR according to the selection signal $SS_1$ already stored within the VCR having the VPS function, and shows the system program of the VCR side.

Figure 9B:
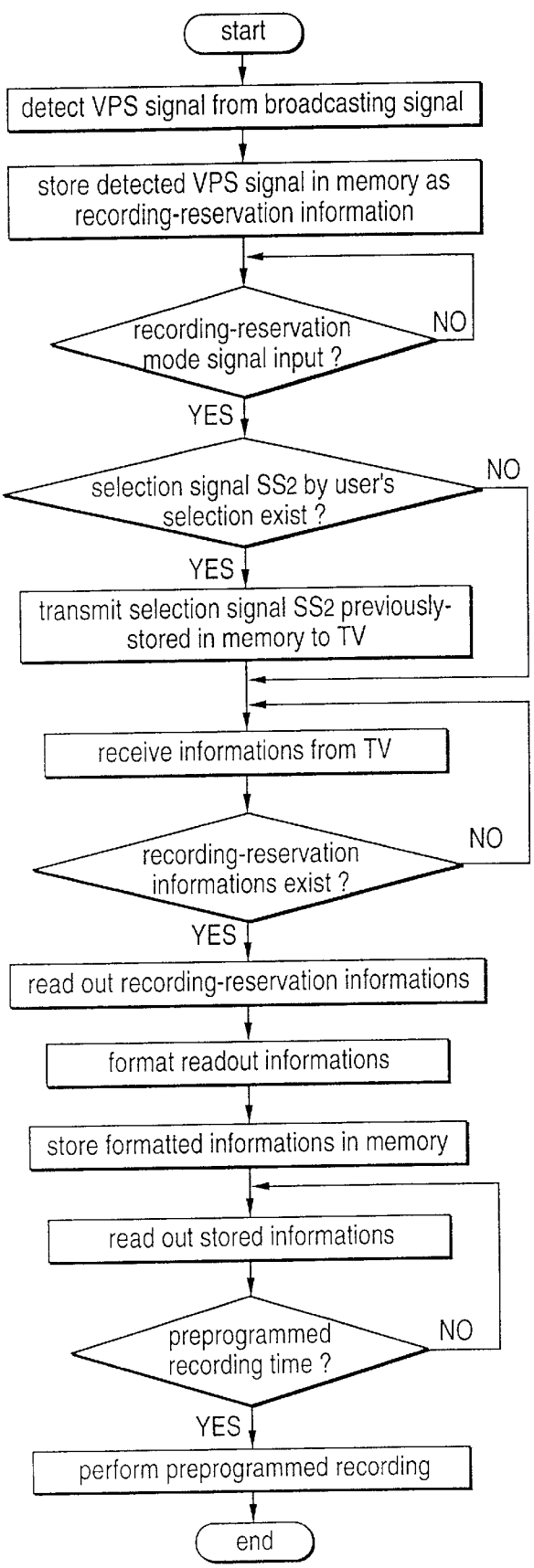
FIG. 9B is a flow chart showing another system program of the VCR according to the second embodiment of the present invention.

FIG. 9B is a flow chart relating to a case where the required recording-reservation information is supplied from the TV to VCR according to the selection signal $SS_2$ or $SS_3$ provided by the user's selection, and shows the system program of the VCR side.

The system program of the TV side according to this embodiment is the same as the first embodiment in which the method according to the present invention is adapted to apply to the VCR having a simple function. Therefore, a detailed description thereof will be omitted (refer to FIGS. 4A and 6A).

Referring to FIG. 9A, the controlling section 44 of the VCR receives the broadcasting signals in order, via a tuner 37.

Then, the VPS signal is detected from each broadcasting signal to store the result in the memory 42 in advance as the recording-reservation information.

Successively, the controlling section 44 of the VCR checks whether or not a signal of recording reservation mode is received from the TV.

Upon receipt of the recording reservation mode by the VCR, a selection signal $SS_1$ previously stored in the memory 42 of FIG. 8 is transmitted to the controlling section 34 of the TV after sequentially passing through the second $I^2C$ bus 47c, scart jack 47a and first $I^2C$ bus 47b.

At this time, the selection signal $SS_1$ is the signal for announcing to the TV that the VCR has the VPS function.

Since the VPS signal already includes the starting time information and ending time information of the desired broadcasting program as described above, the TV supplies the date information, conceal data which is the initial recognition information of the desired broadcasting program, and channel tuning information in the detected teletext data to the VCR in conformity with the system program as shown in FIG. 4A.

The VPS signal can be changed in accordance with the circumstances of the broadcasting station, and the teletext data also involves the changed information. Therefore, the TV provides such conceal data to the VCR having the VPS function so as to prevent an error.

Successively, the controlling section 44 of the VCR receives the information transmitted from the TV to check whether the recording-reservation information exists in the received informations.

If any recording-reservation information exists, the information is read out by the controlling section 44 to be formatted in a desired form prior to being stored in the memory 42.

Thereafter, the controlling section 44 of the VCR reads out the stored recording-reservation informations to check whether the current time matches the preprogrammed recording time.

Upon reaching the preprogrammed recording time, the reserved recording is executed in accordance with the stored recording-reservation information.

This embodiment of the present invention assumes the case where the VPS broadcasting signal is necessarily included in the broadcasting signal. However, the selection signal $SS_1$ may be supplied to the controlling section 34 of the TV to enable the reception of the starting time information and ending time information of the desired broadcasting program from the TV by considering a case where the VPS signal is not included in the broadcasting signal due to a circumstance of the broadcasting station.

FIG. 9B shows another example of a system program of the VCR according to the second embodiment of the present invention. Referring to FIG. 9B, the controlling section 44 of the VCR receives the broadcasting signals, via the antenna ANT4 and tuner 37, to detect the VPS signal from each broadcasting signal.

Since the detected VPS signals include the starting time information and ending time information of the broadcasting program desired to be recorded, they are stored in the memory 42 as the recording-reservation information in accordance with the memory control signal from the controlling section 44.

Then, it is checked whether or not the signal of recording reservation mode is received from the controlling section 34 of the TV.

If the signal of recording reservation mode is received, it is checked whether or not the selection signal $SS_2$ resulting from the user's selection exists after a prescribed time has elapsed. At this time, the detected teletext data will be displayed on the TV screen (or monitor).

As described above, after viewing the displayed teletext data (more specifically, TV guide information), the user provides the key signal for generating the selection signal $SS_2$ or $SS_3$ to the controlling section 34 of the TV, via the key section 35,46 or remote controller 36,45 of the TV (or VCR).

When the selection signal $SS_2$ is absent even after the prescribed time has elapsed, the controlling section 44 of the VCR regards that the user is to directly provide the selection signal $SS_3$ to the controlling section 34 of the TV to detect the information from the TV.

If the selection signal $SS_2$ exists within the prescribed time, it is regarded that the user provided the selection signal $SS_2$ to the TV via the VCR. Thus, the selection signal $SS_2$ is transmitted to the controlling section 34 of the TV, via the scart jack 47a of the interface section 47.

Then, the VCR checks whether the recording-reservation information exists in the information received from the TV. If such information exists, the information is read out, formatted in the desired recording-reservation form, and stored in the memory 42.

Thereafter, the controlling section 44 of the VCR reads out the stored recording-reservation information to check whether or not the current time matches the preprogrammed recording time.

When the current time matches the preprogrammed recording time, the controlling section 44 carries out the recording process of the reserved program.

Third Embodiment

The third embodiment of the present invention is directed to a case where the method according to the present invention is adapted to apply to the VCR having an ACMS function.

Figure 10:
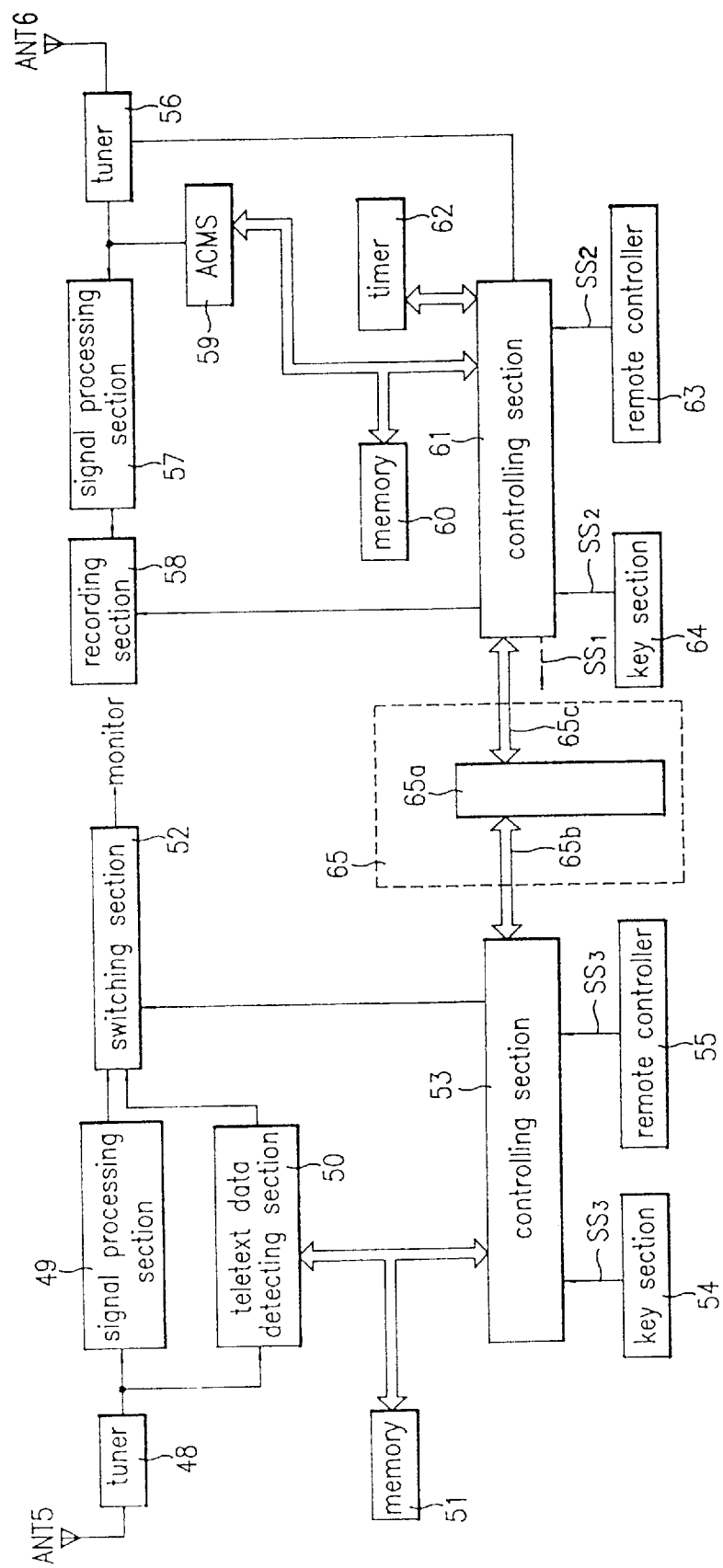
FIG. 10 is a block diagram showing a construction of a TV, a VCR and a bilateral communicating interface section according to a third embodiment of the present invention.

FIG. 10 is a block diagram showing a construction of a TV, a VCR and a bilateral communicating interface section for connecting the TV and VCR according to the third embodiment of the present invention.

Referring to FIG. 10, the TV includes an antenna ANT5, a tuner 48, a signal processing section 49, a teletext data detecting section 50, a memory 51, a switching section 52, a controlling section 53, a key section 54 and a remote controller 55.

Since the construction of the TV shown in FIG. 10 is the same as that shown in FIG. 3 according to the first embodiment, a detailed description thereof will be omitted.

In FIG. 10, the interface has the same functions and construction as the interface section 28 shown in FIG. 3, and a detailed description thereof will thus be omitted.

As shown in FIG. 10, the VCR includes an antenna ANT6, and a tuner 56 for tuning a single broadcasting signal among the broadcasting signals received via the antenna ANT6 in accordance with a tuning control signal. A signal processing section 57 processes the tuned broadcasting signal to be displayed, and a recording section 58 records the processed broadcasting signal on a recording medium. An ACMS 59 automatically maps channels of the broadcasting signals tuned via the tuner 56 to suit a corresponding area by a mapping control signal to provide mapped channel tuning data, and a memory 60 stores the channel tuning data from the ACMS 59 and recording-reservation information transmitted from the TV in accordance with a memory control signal. The memory control signal, mapping control signal and tuning control signal are supplied by a controlling section 61. A timer 62 provides time information to the controlling section 61. Additionally, the VCR includes a remote controller 63 for supplying a key signal for generating a selection signal $SS_2$ to the controlling section 61 by the user's selection in a radio transmission pattern, and a key section 64 for providing the key signal for generating the selection signal $SS_2$ to the controlling section 61 through a wired connection by the user's selection.

The selection signals $SS_1$~$SS_3$ are already described in the first and second embodiments and thus, a detailed description thereof will be omitted.

Figure 11A:
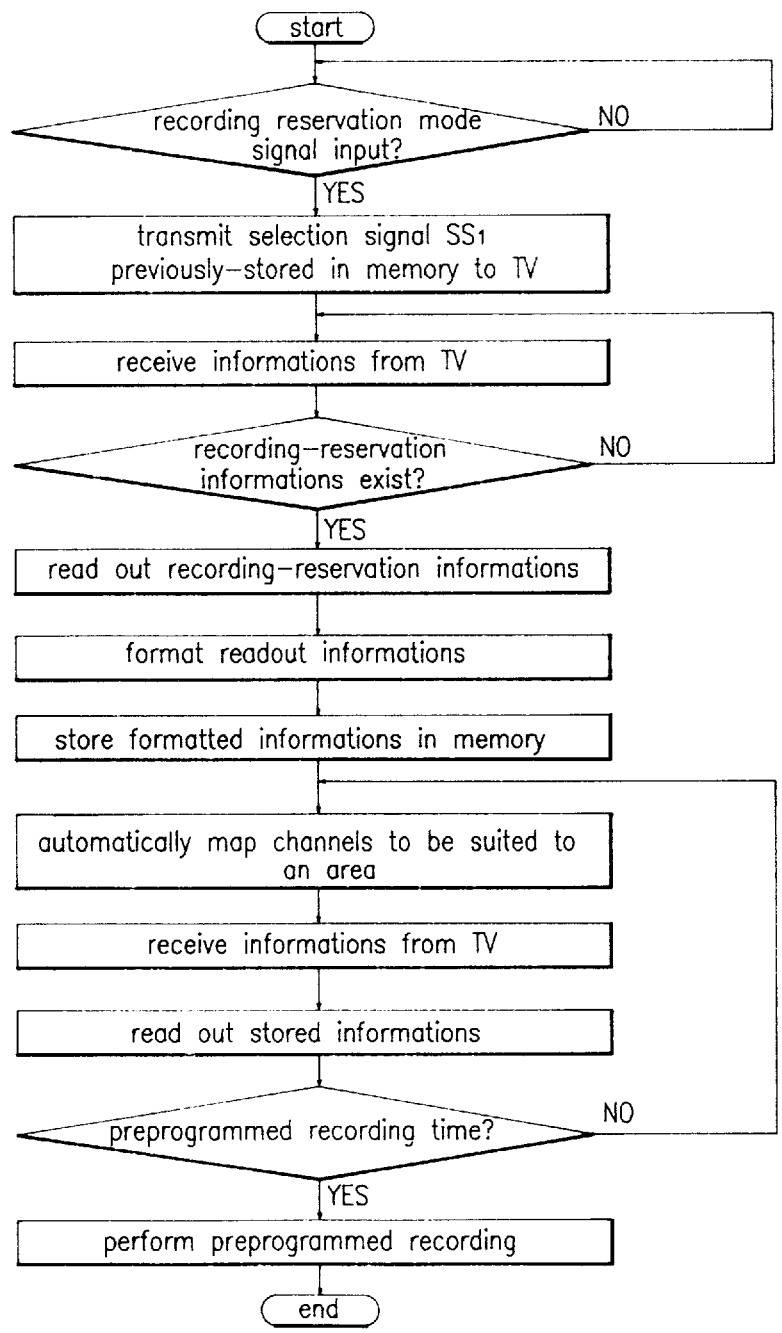
FIG. 11A is a flow chart showing one system program of the VCR according to the third embodiment of the present invention.

FIG. 11A is a flow chart showing a case where the required recording-reservation information is supplied from the TV to VCR according to the selection signal $SS_1$ previously-stored in the VCR having the ACMS function, and shows the system program of the VCR side.

Figure 11B:
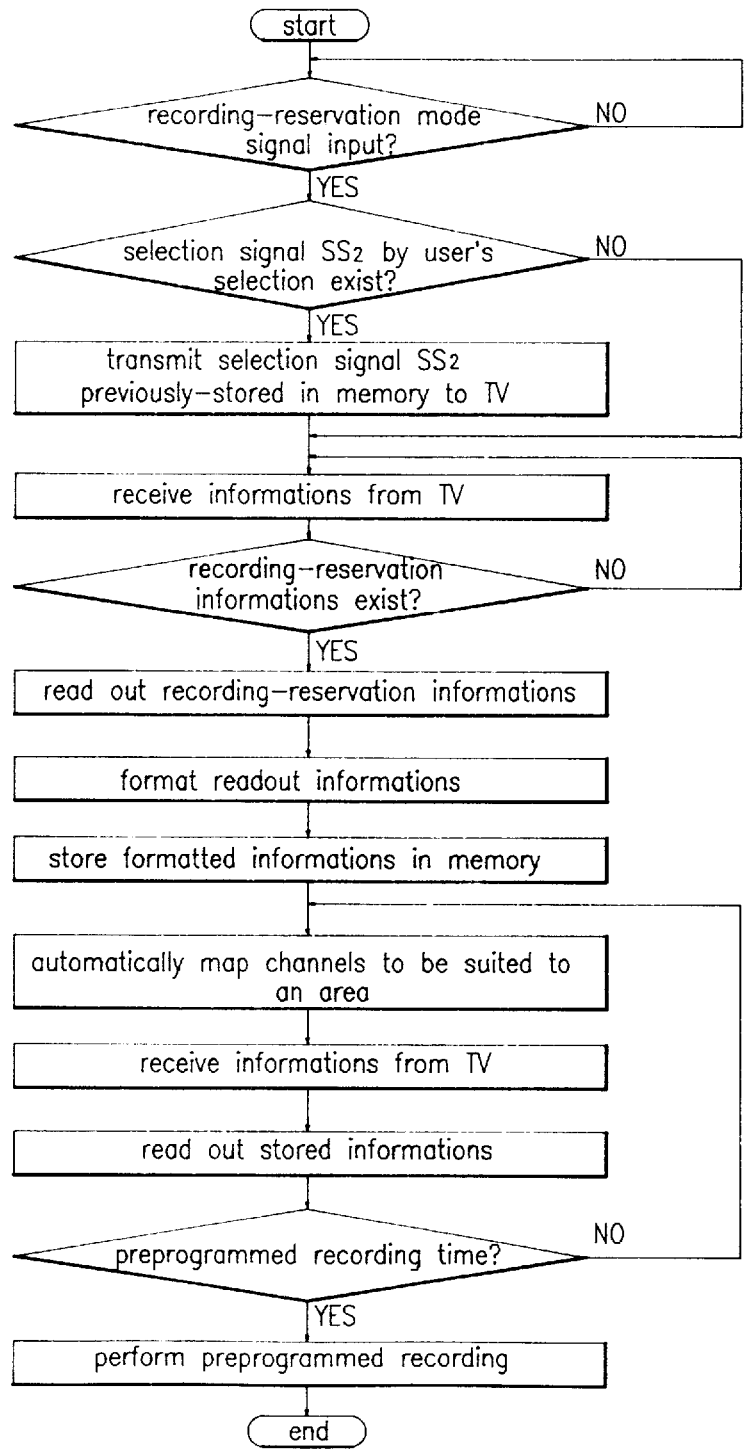
FIG. 11B is a flow chart showing another system program of the VCR according to the third embodiment of the present invention.

FIG. 11B is a flow chart showing a case where the required recording-reservation information is supplied from the TV to VCR according to the selection signal $SS_2$ or $SS_3$ provided by the user's selection, and shows the system program of the VCR side.

The system program of the TV side is the same as the first embodiment's and thus, a detailed description thereof will be omitted (refer to FIGS. 4A and 6A).

Referring to FIG. 11A, the controlling section 61 of the VCR checks whether or not a signal of recording reservation mode is received from the TV.

Upon receipt of the recording reservation mode by the VCR, the selection signal $SS_1$ previously stored in the memory 60 of FIG. 10 is transmitted to the controlling section 53 of the TV after sequentially passing through the second $I^2C$ bus 65c, scart jack 65a and first $I^2C$ bus 65b. At this time, the selection signal $SS_1$ is the signal for announcing that the VCR has the ACMS function.

Since the ACMS 59 of FIG. 10 generates the mapped channel tuning data as described above, it is unnecessary to receive the channel tuning data from the TV.

Accordingly, the TV supplies to the VCR just the recording-reservation information, such as broadcasting station recognition information, date information, and starting time information and ending time information of a desired broadcasting program required for the VCR having the ACMS function in conformity with the system program as shown in FIG. 4A.

Successively, the controlling section 61 of the VCR receives the information transmitted from the TV to check whether the recording-reservation information exists in the received information.

If it does exist, the information is read out by the controlling section 61 and formatted in a desired form prior to being stored in the memory 60.

Thereafter, the ACMS 59 is utilized to automatically map channels of the broadcasting signals to suit the corresponding area, to form the mapped channel tuning data, and to store the mapped channel tuning data in the memory 60 as one recording-reservation information.

Then, the controlling section 61 of the VCR reads out the stored recording-reservation information to check whether or not the current time matches the preprogrammed recording time.

Upon reaching the preprogrammed recording time, the reserved recording is executed in accordance with the stored recording-reservation information.

Referring to FIG. 11B, the controlling section 61 of the VCR checks whether or not the signal of recording reservation mode is received from the controlling section 53 of the TV.

If the signal of recording reservation mode is received, it is checked whether or not the selection signal $SS_2$ resulting from the user's selection exists after a prescribed time has elapsed.

At this time, the detected teletext data (more specifically, TV guide information) will be displayed on the TV screen (or monitor).

As described above, after viewing the displayed teletext data, the user provides the key signal for generating selection signal $SS_2$ or $SS_3$ to the controlling section 53 of the TV, via the key section or remote controller of the TV (or VCR).

When the selection signal $SS_2$ is absent even after the prescribed time has elapsed, the controlling section 61 of the VCR regards that the user will directly provide the selection signal $SS_3$ to the controlling section 53 of the TV to receive the information from the TV.

If the selection signal $SS_2$ exists within the prescribed time, it is regarded that the user provided the selection signal $SS_2$ to the TV via the VCR. Thus, the selection signal $SS_2$ is transmitted to the controlling section 53 of the TV, via the scart jack 65a of the interface section 65.

Then, the VCR checks whether the recording-reservation information, i.e., broadcasting station recognition information, date information, and starting time information and ending time information of the desired broadcasting program, exists in the information received from the TV.

If it does exist, the information is read out to be formatted in the desired form, and stored in the memory 60.

Furthermore, the ACMS 59 is utilized to automatically map the channels of the broadcasting signals sequentially received via the tuner 56 to suit the corresponding area, thereby forming the mapped channel tuning data. The mapped channel tuning data is stored in the memory 60 as one recording-reservation information.

Thereafter, the controlling section 61 of the VCR reads out the stored recording-reservation information to check whether the current time matches the preprogrammed recording time.

When the current time reaches the preprogrammed recording time, the controlling section 61 carries out the recording process of the reserved program.

Fourth Embodiment

The fourth embodiment of the present invention shows a case where the method according to the present invention is adapted to apply to the VCR having both VPS and ACMS functions.

Figure 12:
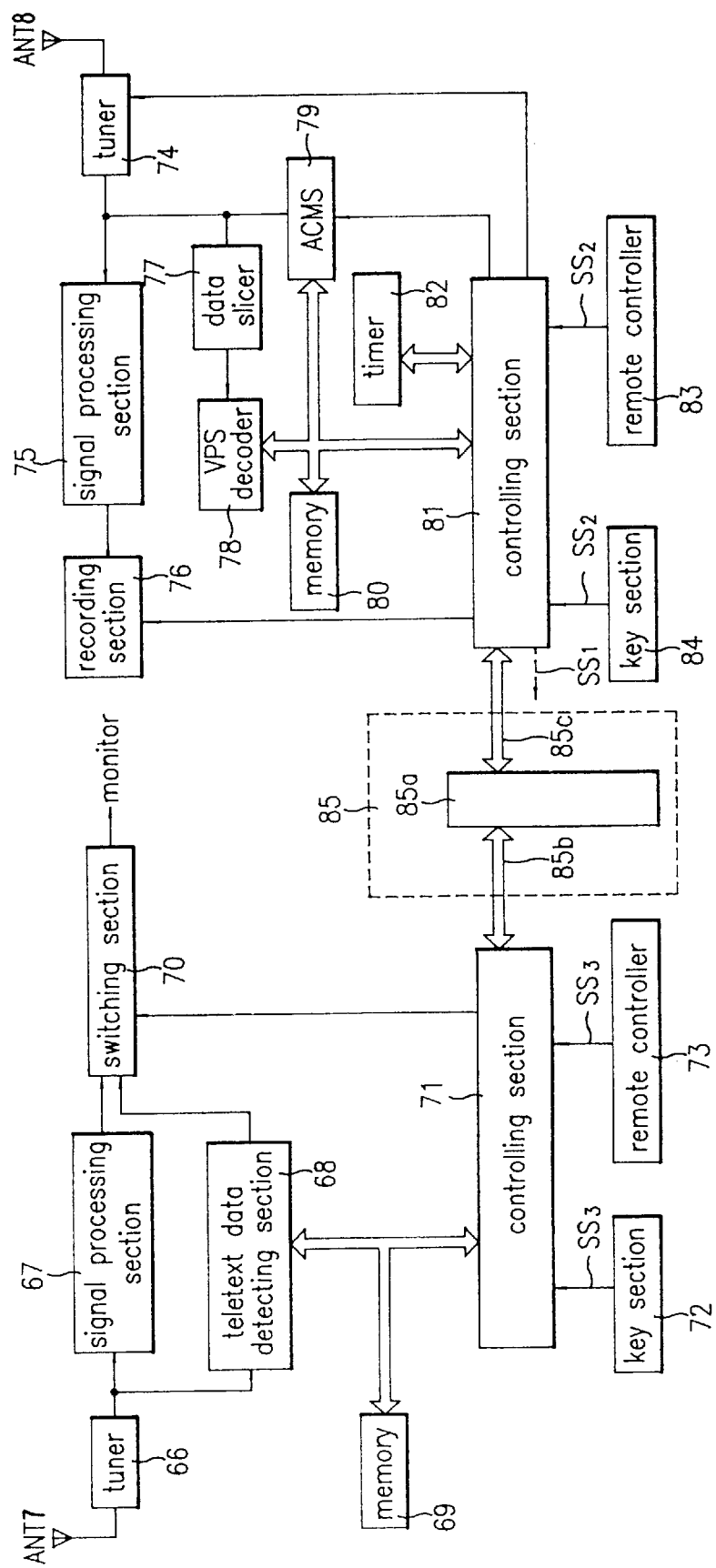
FIG. 12 is a block diagram showing a construction of a TV, a VCR and a bilateral communicating interface section according to a fourth embodiment of the present invention.

FIG. 12 is a block diagram showing a construction of a TV, a VCR and an interface section for connecting the VCR and TV according to the fourth embodiment of the present invention.

Referring to FIG. 12, the TV according to the fourth embodiment of the present invention includes an antenna ANT7, a tuner 66, a signal processing section 67, a teletext data detecting section 68, a memory 69, a switching section 70, a controlling section 71, a key section 72 and a remote controller 73.

The construction of the TV shown in FIG. 12 is substantially identical to that shown in FIG. 3 of the first embodiment. Therefore, the detailed description of the construction of the TV will be omitted.

As shown in FIG. 12, the VCR includes an antenna ANT8, and a tuner 74 for tuning a single broadcasting signal among the broadcasting signals received via the antenna ANT8 in accordance with a tuning control signal. A signal processing section 75 processes the tuned broadcasting signal to be recordable, and a recording section 176 records the broadcasting signal from the signal processing section 75 on a recording medium. A data slicer 77 slices the tuned broadcasting signal, and a VPS decoder 78 detects a VPS signal (which is typically included in the 16th line of the broadcasting signal) from the sliced broadcasting signal according to a decoding control signal. An ACMS 79 automatically maps the broadcasting signals sequentially tuned via the tuner 74 to suit a corresponding area by a mapping control signal to provide mapped channel tuning data, and a memory 80 stores the VPS signal, mapped channel tuning data and recording-reservation information transmitted from the TV in accordance with a memory control signal. The above-described decoding control signal, memory control signal, mapping control signal and previously-stored selection signal $SS_1$ are supplied by a controlling section 81. A timer 82 provides time information to the controlling section 81 when the VPS signal is absent. Additionally, the VCR includes a remote controller 83 for supplying a key signal for generating a selection signal $SS_2$ to the controlling section 81 by the user's selection in a radio transmission pattern, and a key section 84 for providing the key signal for generating a selection signal $SS_2$ to the controlling section 81 through a wired connection by the user's selection.

Identical to the first embodiment, the interface section 85 has a scart jack 85a, a first $I^2C$ bus 85b for connecting the controlling section 71 of the TV with the scart jack 85a, and a second $I^2C$ bus 85c for connecting the controlling section 81 of the VCR with the scart jack 85a. Further, the interface section 85 may belong to the TV side or the VCR side.

In FIG. 12, since the starting and ending time information of the desired program is included in the VPS signal detected in the VPS decoder 78, it is unnecessary to supply the same from the TV side.

Moreover, since the channel tuning data is formed by the ACMS 79, it is unnecessary to supply the channel tuning data from the TV.

Figure 13A:
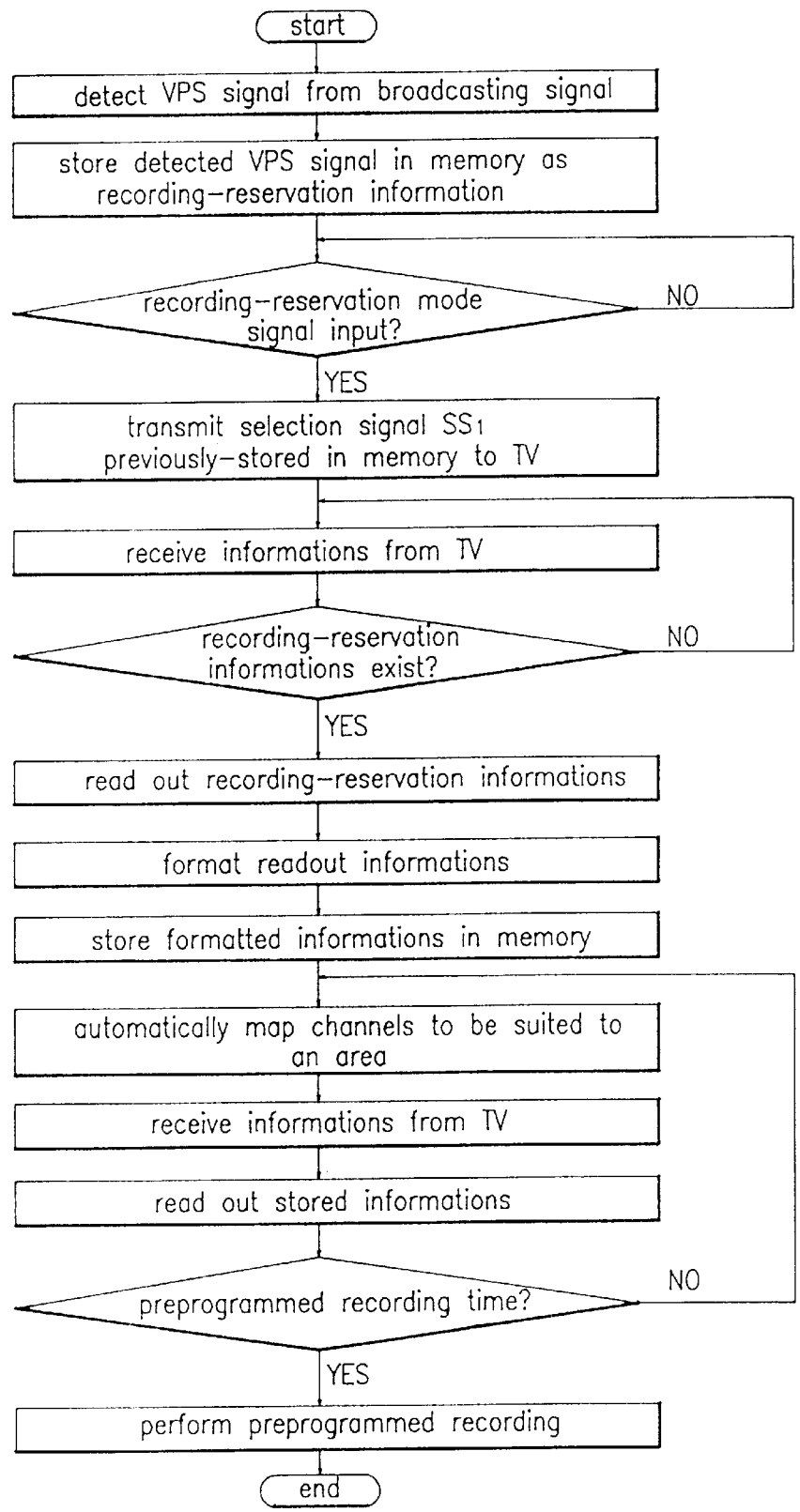
FIG. 13A is a flow chart showing one system program of the VCR according to the fourth embodiment of the present invention.

FIG. 13A is a flow chart showing a case where the required recording-reservation information is supplied from the TV to VCR according to a selection signal $SS_1$ supplied intrinsically from the VCR having both VPS and ACMS functions, and shows the system program of the VCR side solely.

Figure 13B:
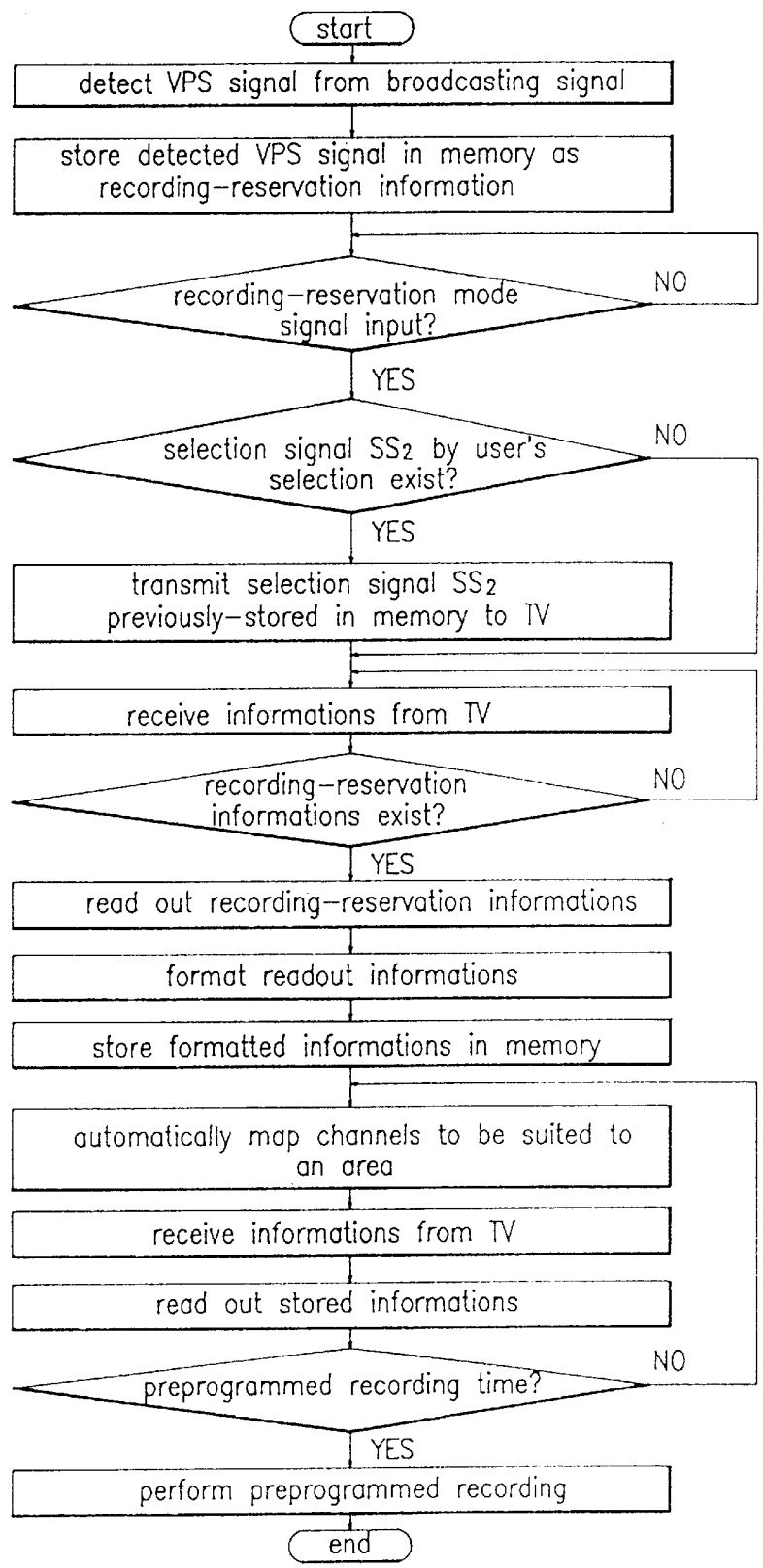
FIG. 13B is a flow chart showing another system program of the VCR according to the fourth embodiment of the present invention.

FIG. 13B is a flow chart showing a case where the required recording-reservation information is supplied from the TV to VCR having the VPS and ACMS functions in accordance with a selection signal $SS_2$ or $SS_3$ provided by the user's selection, and shows the system program of the VCR side solely.

The system program of the TV side according to this embodiment is the same as the first embodiment directed to the VCR having a simple function, and a detailed description thereof will thus be omitted (refer to FIGS. 4A and 6A).

Referring to FIG. 13A, the controlling section 81 of the VCR receives the broadcasting signals in order, via a tuner 74, to detect the VPS signal from each broadcasting signal to store the result in the memory 80 as the recording-reservation information.

Successively, the controlling section 81 of the VCR checks whether or not a signal of recording reservation mode is received from the TV.

Upon receipt of the recording reservation mode, the selection signal $SS_1$ previously stored in the memory 80 of FIG. 12 is transmitted to the controlling section 71 of the TV after sequentially passing through the second I²C bus 85c, scart jack 85a and first I²C bus 85b. At this time, the selection signal $SS_1$ is the signal for announcing that the VCR has the VPS and ACMS functions.

Since the VPS signal has the starting time information and ending time information of the desired broadcasting program as described above, the TV supplies broadcasting station recognition information, date information and conceal data being the initial recognition information of the desired broadcasting program in the teletext data stored in the VCR, in conformity with the system program as shown in FIG. 4A.

The VPS signal can be changed in accordance with the circumstances of the broadcasting station, and the teletext data involves the changed information. Therefore, the TV further provides the conceal data to the VCR having the VPS function so as to prevent an error.

Successively, the controlling section 81 of the VCR receives the informations transmitted from the TV to check whether or not the recording-reservation information, i.e., broadcasting station recognition information, date information, and conceal data being the initial recognition information of the desired broadcasting program, exists in the received informations.

If it does exist, the information is read out by the controlling section 81 and formatted in a desired form prior to being stored in the memory 80.

Thereafter, the ACMS 79 is utilized to automatically map channels of the broadcasting signals sequentially received via tuner 74 to suit the corresponding area, thereby forming the mapped channel tuning data. Then, the mapped channel tuning data is stored in the memory 80 as one recording-reservation information.

The controlling section 81 of the VCR reads out the stored recording-reservation information to check whether or not the current time matches the preprogrammed recording time. When the current time matches the preprogrammed recording time, the reserved recording operation is executed in accordance with the stored recording-reservation information.

In this embodiment, it is assumed that the VPS broadcasting signal is necessarily included in the broadcasting signal. However, by considering a case where the VPS signal is not included in the broadcasting signal due to a particular circumstance of the broadcasting station, the selection signal $SS_1$ may be supplied to the controlling section 81 of the TV to enable the reception of the starting time information and ending time information of the desired broadcasting program from the TV.

Referring to FIG. 13B, the controlling section 81 of the VCR receives the broadcasting signals in order, via the antenna ANT8 and tuner 74, to detect the VPS signal from each broadcasting signal.

Since the detected VPS signals include the starting time information and ending time information of the broadcasting program desired to be recorded, they are stored in the memory 80 as the recording-reservation information according to the memory control signal from the controlling section 81.

Successively, it is checked whether or not the signal of recording reservation mode is present from controlling section 71 of the TV.

If the signal of recording reservation mode is received, it is checked whether or not the selection signal $SS_2$ resulting from the user's selection exists after a prescribed time has elapsed. At this time, the detected teletext data will be displayed on the TV screen (or monitor).

As described above, after viewing the displayed teletext data (more specifically, TV guide information), the user provides the key signal for generating the selection signal $SS_2$ or $SS_3$ to the controlling section 71 of the TV, via the key section or remote controller of the TV (or VCR).

When the selection signal $SS_2$ is absent even after the prescribed time has elapsed, the controlling section 81 of the VCR regards that the user will directly provide the selection signal $SS_3$ to the controlling section 71 of the TV to detect the information from the TV.

If the selection signal $SS_2$ exists within the prescribed time, it is regarded that the user provided the selection signal $SS_2$ to the TV via the VCR. Thus, the selection signal $SS_2$ is transmitted to the controlling section 71 of the TV, via the scart jack 85a of the interface section 85.

Then, the VCR checks whether the recording-reservation information exists in the informations received from the TV. If it does exist, the information is read out, formatted in the desired form, and stored in the memory 80.

After this, the controlling section 81 utilizes the ACMS 79 to automatically map the channels of the broadcasting signals sequentially received via the tuner 74 to suit the corresponding area, thereby forming the mapped channel tuning data.

The mapped channel tuning data is stored in the memory 80 as one recording-reservation information.

Thereafter, the controlling section 81 of the VCR reads out the stored recording-reservation information to check whether the current time matches the preprogrammed recording time.

When the current time matches the preprogrammed recording time, the controlling section 81 carries out the recording operation of the reserved program.

As described with reference to the first to fourth embodiments, the present invention has advantages including the following.

First, the recording-reservation data is supplied from the TV to VCR without separately requiring expensive elements such as the VPS decoder, ACMS and teletext decoder, in the construction of the VCR, thereby significantly lowering the manufacturing cost of the VCR.

Second, regardless of a VCR type, the recording-reservation data required for the VCR can be supplied from the TV, providing compatibility between the TV and VCR.

Third, since all recording-reservation data can be provided from the TV, it is convenient for a user to preprogram the recording operation.

That is, in the conventional recording reservation method in which the VCR is the main subject, the user must power on the VCR as well as the TV to watch the TV guide information, and both key sections of the TV and VCR must be manipulated to record reservation information. However, in the method according to the present invention, the recording reservation mode can be is carried out by manipulating the TV alone without ever turning on the power of the VCR, providing a convenient and simplified process.

While the present invention has been particularly shown and described with reference to particular embodiment thereof, it will be understood by those skilled in the art that various changes in form and details may be effected therein without departing from the spirit and scope of the invention as defined by the appended claims.

What is claimed is:

1. A method for providing recording-reservation data to a VCR using a TV, comprising the steps of:
   receiving broadcasting signals;
   detecting teletext data from the received broadcasting signals;
   storing the detected teletext data in a memory of the TV;
   transmitting at least one information from the store teletext data, required for recording reservation of the VCR to the VCR in accordance with selection signals supplied to the TV, the selection signals including a VCR type signal indicating the type of the VCR and user's selection signals; and
   storing the transmitted, at least one information in a memory of the VCR as recording reservation information.

2. A method for providing recording-reservation data to a VCR using a TV as claimed in claim 1, wherein the VCR type signal is automatically supplied to the TV by the VCR without user's selection.

3. A method for providing recording-reservation data to a VCR using a TV as claimed in claim 1, wherein the user's selection signals are directly supplied to the TV by a user's selection.

4. A method for providing recording-reservation data to a VCR using a TV as claimed in claim 2, wherein the user's selection signals are supplied to the TV by the user's selection.

5. A method for providing recording-reservation data to a VCR using a TV, comprising the steps of:
   receiving broadcasting signals;
   detecting teletext data from the received broadcasting signals;
   storing the detected teletext data in a memory of the TV;
   transmitting date information, starting time information of a desired broadcasting program, ending time information of the desired broadcasting program and channel tuning information required for recording reservation of the VCR, from the stored teletext data, to said VCR in accordance with selection signals supplied to the TV, the selection signals including a VCR type signal indicating the type of the VCR and user's selection signals; and
   storing said transmitted information in a memory of the VCR as recording-reservation information.

6. A method for providing recording-reservation data to a VCR using a TV, comprising the steps of:
   receiving broadcasting signals;
   detecting teletext data from the received broadcasting signals;
   storing the detected teletext data in a memory of the TV;
   transmitting from the stored teletext data, date information, conceal data being initial recognition information of a desired broadcasting program and channel tuning information required for recording reservation of the VCR to the VCR in accordance with selection signals supplied to the TV, the selection signals including a VCR type signal indicating the type of the VCR and user's selection signals; and
   storing said transmitted information in a memory of the VCR as recording-reservation information.

7. A method for providing recording-reservation data to a VCR using a TV, comprising the steps of:
   receiving broadcasting signals;
   detecting teletext data from the received broadcasting signals;
   storing the detected teletext data in a memory of the TV;
   transmitting from the stored teletext data, broadcasting station recognition information, date information, starting time information and ending time information of a desired program required for recording reservation of the VCR to the VCR in accordance with selection signals supplied to the TV, the selection signals including a VCR type signal indicating the type of the VCR and user's selection signals; and
   storing the transmitted information in a memory of the VCR as recording-reservation information.

8. A method for providing recording-reservation data to a VCR using a TV, comprising the steps of:
   receiving broadcasting signals;
   detecting teletext data from the received broadcasting signals;
   storing the detected teletext data in a memory of the TV;
   transmitting from the store teletext data, broadcasting station recognition information, date information and conceal data being initial recognition information of a desired broadcasting program required for recording reservation of the VCR to the VCR in accordance with selection signals supplied to the TV, the selection signals including a VCR type signal indicating the type of the VCR and user's selection signals; and
   storing the transmitted information in a memory of the VCR as recording-reservation information.

9. A method for providing recording-reservation data to a VCR using a TV, comprising the steps of:
   receiving broadcasting signals;
   detecting teletext data from the received broadcasting signals;
   storing the detected teletext data in a memory of the TV;
   displaying the stored teletext information on a TV screen;
   transmitting at least one information required for recording reservation of the VCR from the displayed information to the VCR in accordance with selection signals supplied to the TV, the selection signals including a VCR type signal indicating the type of the VCR and user's selection signals; and
   storing the transmitted at least one information in a memory of the VCR.

10. A method for providing recording-reservation data to a VCR using a TV, comprising the steps of:
   receiving broadcasting signals;
   detecting teletext data from the received broadcasting signals;
   storing the detected teletext data in a memory of the TV;
   displaying the stored teletext information on a TV screen;
   transmitting from the displayed information, date information, starting time information and ending time information of a desired broadcasting program and channel tuning information required for preprogrammed recording of the VCR to the VCR in accordance with selection signals supplied to the TV, the selection signals including a VCR type signal indicating the type of the VCR and user's selection signals; and storing the information in a memory of the VCR.

11. A method for providing recording-reservation data to a VCR using a TV, comprising the steps of:

receiving broadcasting signals;

detecting teletext data from the received broadcasting signals;

storing the detected teletext data in a memory of the TV;

displaying the stored teletext information on a TV screen;

transmitting from the displayed information date information, conceal data being initial recognition information of a desired broadcasting program and channel tuning information required for preprogrammed recording of the VCR to the VCR in accordance with selection signals supplied to the TV, the selection signals including a VCR type signal indicating the type of the VCR and user's selection signals; and storing the transmitted information in a memory of the VCR.

12. A method for providing recording-reservation data to a VCR using a TV, comprising the steps of:

receiving broadcasting signals;

detecting teletext data from the received broadcasting signals;

storing the detected teletext data in a memory of the TV;

displaying from the displayed information, broadcasting station recognition information, date information, starting time information and ending time information of a desired program required for preprogrammed recording of the VCR to the VCR in accordance with selection signals supplied to the TV, the selection signals including a VCR type signal indicating the type of the VCR and user's selection signals; and storing the transmitted information in a memory of the VCR.

13. A method for providing recording-reservation data to a VCR using a TV, comprising the steps of:

receiving broadcasting signals;

detecting teletext data from the received broadcasting signals;

storing the detected teletext data in a memory of the TV;

displaying the stored teletext information on a TV screen;

transmitting from the displayed information, broadcasting station recognition information, date information and conceal data being initial recognition information of a desired broadcasting program required for preprogrammed recording of the VCR in the displayed information to the VCR in accordance with selection signals supplied to the TV, the selection signals including a VCR type signal indicating the type of the VCR and user's selection signals; and storing the transmitted information in a memory of the VCR.

14. A television comprising:

receiving means for receiving broadcasting signals;

detecting means for detecting teletext data from said received broadcasting signals;

memory means for storing said detected teletext data;

controlling means for providing at least one information from said stored teletext data to said memory means as recording-reservation data of a VCR in accordance with supplied selection signals, the selection signals including a VCR type signal indicating the type of the VCR and user's selection signals; and interface means for bilaterally connecting the VCR and the controlling means to transmit at least one information supplied from the memory means to the VCR.

15. A television as claimed in claim 14, wherein said interface means comprises:

a bilateral communicating jack;

a first bilateral communicating bus for connecting said controlling means and said bilateral communicating jack; and a second bilateral communicating bus for connecting said bilateral communicating jack and said VCR.

16. A television as claimed in claim 15, wherein said bilateral communicating jack is a scart jack, and first and second bilateral communicating buses are inter IC ($I^2C$) buses.

17. A television as claimed in claim 14, wherein said interface means comprises:

a radio signal transmitting section connected to the controlling means for formatting the recording-reservation data of the VCR to a radio signal to be transmitted to the VCR; and a radio signal receiving section for receiving a radio selection signal from the VCR.

18. A television as claimed in claim 17, wherein said radio signal is an infrared ray signal.

19. A television as claimed in claim 14, further comprising:

a monitor for displaying said teletext data stored in said memory means;

a key section for supplying a key signal for generating said selection signal in said displayed teletext data to said controlling means through wired connection by a user's selection; and a remote controller for supplying said key signal for generating said selection signal in said displayed teletext data to said controlling means in radio communication pattern.

20. A video cassette recorder (VCR) comprising:

bilateral communicating interface means for transmitting selection signals to a television (TV), the selection signals including a VCR type signal indicating the type of the VCR and user's selection signals, and receiving at least one recording-reservation information transmitted from said TV in accordance with said selection signals;

memory means for storing at least one recording-reservation information supplied from said TV in accordance with a memory control signal; and controlling means for supplying said selection signals to said TV via said bilateral communicating interface means, and supplying said memory control signal to said memory means.

21. A VCR as claimed in claim 20, wherein said interface means comprises:

a bilateral communicating jack;

a first bilateral communicating bus for connecting said bilateral communicating jack and the TV; and a second bilateral communicating bus for connecting said controlling means and bilateral communicating jack.

22. A VCR as claimed in claim 21, wherein said bilateral communicating jack is a scart jack, and first and second bilateral communicating buses are inter IC buses.

23. A VCR as claimed in claim 20, wherein said interface means comprises:
   a radio signal transmitting section for formatting said selection signals in a radio signal form to be transmitted to the TV; and
   a radio signal receiving section of receiving at least one recording-reservation information transmitted in said radio signal form from said TV.

24. A VCR as claimed in claim 23, wherein said radio signal form is an infrared ray signal form.

25. A VCR as claimed in claim 20, wherein said VCR type signal is automatically supplied from said controlling means without user's selections.

26. A VCR as claimed in claim 20, wherein said user's selection signals are directly supplied by a user's selection.

27. A VCR as claimed in claim 20, further comprising:
   a key section for supplying a key signal for generating said user's selection signals by the user's selection to said controlling means; and
   a remote controller for supplying said key signal for generating said user's selection signals to said controlling means.

28. A video cassette recorder (VCR) for interacting with a television (TV), comprising:
   a tuner for tuning a single broadcasting signal among broadcasting signals received via an antenna in accordance with a tuning control signal;
   a signal processing section for processing said tuned broadcasting signal to be recordable;
   a recording section for recording said processed broadcasting signal on a recording medium in accordance with a record control signal;
   a memory for storing at least one recording-reservation data transmitted from said TV in accordance with a memory control signal;
   a controlling section for supplying said memory control signal, tuning control signal and record control signal, and supplying selection signals, the selection signals including a VCR type signal indicating the type of the VCR and user's selection signals;
   a timer for providing time information to said controlling section; and
   a bilateral communicating interface section for transmitting said selection signals to said TV, and transmitting at least one recording-reservation information from said TV to said controlling section in accordance with said selection signals.

29. A video cassette recorder (VCR) for interacting with a television (TV), comprising:
   a tuner for tuning a single broadcasting signal among broadcasting signals received via an antenna in accordance with a tuning control signal;
   a signal processing section for processing said tuned broadcasting signal to be recordable;
   a recording section for recording said processed broadcasting signal on a recording medium in accordance with a record control signal;
   a data slicer for slicing said tuned broadcasting signal;
   a video program system (VPS) decoder for detecting a VPS signal from said sliced broadcasting signal in accordance with a decoding control signal;
   a memory for storing said VPS signal and recording-reservation information transmitted from the TV in accordance with a memory control signal;
   a controlling section for supplying said decoding control signal, memory control signal and selection signals, the selection signals including a VCR type signal indicating the type of the VCR and user's selection signals;
   a timer for providing time information to said controlling section when said VPS signal is absent; and
   a bilateral communicating interface section for transmitting said selection signals to said TV, and transmitting at least one recording-reservation information from said TV to said controlling section in accordance with said selection signals.

30. A video cassette recorder (VCR) comprising:
   a tuner for tuning a single broadcasting signal among broadcasting signals received via an antenna in accordance with a tuning control signal;
   a signal processing section for processing said tuned broadcasting signal to be recordable;
   a recording section for recording said processed broadcasting signal on a recording medium in accordance with a record control signal;
   an automatic channel mapping system (ACMS) for automatically mapping channels of said broadcasting signals tuned via said tuner to be suited to a corresponding area to form mapped channel tuning data in accordance with a mapping control signal;
   a memory for storing said channel tuning data mapped by said ACMS and at least one recording-reservation information transmitted from the TV;
   a controlling section for supplying said memory control signal, mapping control signal and tuning control signal and supplying selection signals, the selection signals including a VCR type signal indicating the type of the VCR and user's selection signals;
   a timer for providing time information to said control section; and
   a bilateral communicating interface section for transmitting said selection signals to said TV, and transmitting at least one recording-reservation information from said TV to said controlling section in accordance with said selection signals.

31. A video cassette recorder (VCR) comprising:
   a tuner for tuning a single broadcasting signal among broadcasting signals in accordance with a tuning control signal;
   a signal processing section for processing said tuned broadcasting signal to be recordable;
   a recording section for recording said processed broadcasting signal on a recording medium in accordance with a record control signal;
   an automatic channel mapping system (ACMS) for automatically mapping channels of said broadcasting signals tuned via said tuner to be suited to a corresponding area to form mapped channel tuning data in accordance with a mapping control signal;
   a video program system (VPS) decoder for detecting a VPS signal from the broadcasting signal;
   a memory for storing said VPS signal, mapped channel tuning data and at least one recording-reservation information transmitted from a TV in accordance with a memory control signal;
   a controlling section for supplying said decoding control signal, memory control signal, mapping control signal and selection signals, the selection signals including a VCR type signal indicating the type of the VCR and user's selection signals;

a timer for providing time information to said controlling section when said VPS signal is absent; and a bilateral communicating interface section for transmitting said selection signals to said TV, and transmitting at least one recording-reservation information from said TV to aid controlling section in accordance with said selection signals.

32. A method for providing recording-reservation data to a VCR using a TV as claimed in claim 5, wherein the VCR type signal is automatically supplied to the TV by the VCR without user's selection.

33. A method for providing recording-reservation data to a VCR using a TV as claimed in claim 6, wherein the VCR type signal is automatically supplied to the TV by the VCR without user's selection.

34. A method for providing recording-reservation data to a VCR using a TV as claimed in claim 7, wherein the VCR type signal is automatically supplied to the TV by the VCR without user's selection.

35. A method for providing recording-reservation data to a VCR using a TV as claimed in claim 8, wherein the VCR type signal is automatically supplied to the TV by the VCR without user's selection.

36. A method for providing recording-reservation data to a VCR using a TV as claimed in claim 9, wherein the VCR type signal is automatically supplied to the TV by the VCR without user's selection.

37. A method for providing recording-reservation data to a VCR using a TV as claimed in claim 1, wherein the VCR type signal indicates whether the VCR has a simple function, a VPS (video program system) function, or an ACMS (automatic channel mapping system) function.

38. A television as claimed in claim 14, wherein the VCR type signal indicates whether the VCR has a simple function, a VPS (video program system) function, or an ACMS (automatic channel mapping system) function.

39. A VCR as claimed in claim 20, wherein the VCR type signal indicates whether the VCR has a simple function, a VPS (video program system) function, or an ACMS (automatic channel mapping system) function.

\* \* \* \* \*